United States Patent
Jain et al.

(10) Patent No.: US 11,673,752 B2
(45) Date of Patent: Jun. 13, 2023

(54) DISPENSER VANE

(71) Applicant: 6D Bytes Inc., Sunnyvale, CA (US)

(72) Inventors: Vipin Jain, Saratoga, CA (US); Venkateswaran Ayalur, Cupertino, CA (US); Vijayasimha Doddabalapur, Foster City, CA (US); Kevin Andrew Marshall, Sunnyvale, CA (US); Jessica Pei-Sheng Murphy, San Mateo, CA (US)

(73) Assignee: 6D Bytes Inc., Sunnyvale, CA (US)

( * ) Notice: Subject to any disclaimer, the term of this patent is extended or adjusted under 35 U.S.C. 154(b) by 0 days.

(21) Appl. No.: 17/478,744

(22) Filed: Sep. 17, 2021

(65) Prior Publication Data

US 2022/0017313 A1 Jan. 20, 2022

Related U.S. Application Data

(63) Continuation of application No. 16/782,981, filed on Feb. 5, 2020, now Pat. No. 11,142,412, which is a continuation-in-part of application No. 16/051,052, filed on Jul. 31, 2018, now abandoned.

(60) Provisional application No. 62/652,740, filed on Apr. 4, 2018.

(51) Int. Cl.
*B65G 65/48* (2006.01)
*B65G 65/00* (2006.01)

(52) U.S. Cl.
CPC ....... *B65G 65/4881* (2013.01); *B65G 65/005* (2013.01); *B65G 2201/0211* (2013.01); *B65G 2812/0645* (2013.01); *B65G 2814/0302* (2013.01); *B65G 2814/0325* (2013.01); *B65G 2814/0344* (2013.01)

(58) Field of Classification Search
USPC .......................................... 141/83
See application file for complete search history.

(56) References Cited

U.S. PATENT DOCUMENTS

| 230,188 | A |   | 7/1880 | Konrad |
| 674,057 | A | * | 5/1901 | Edison ...................... B02C 4/32 241/230 |
| 810,427 | A |   | 1/1906 | Owens |
| 1,271,011 | A |   | 7/1918 | Bingham |
| 2,681,211 | A |   | 6/1954 | Reynolds |
| 2,849,215 | A |   | 8/1958 | Hurst |
| 3,933,086 | A | * | 1/1976 | Standing ................ A23N 15/06 241/227 |

(Continued)

FOREIGN PATENT DOCUMENTS

TW 132888 4/1990

OTHER PUBLICATIONS rubbermill.com .pdf—Durometer. (Website and .pdf found at https://rubbermill.com/wp-content/uploads/durometer.pdf) (Year: 2022).*

(Continued)

*Primary Examiner* — Timothy P. Kelly
*Assistant Examiner* — Christopher M Afful
(74) *Attorney, Agent, or Firm* — Fountainhead Law Group P.C.

(57) ABSTRACT

In one embodiment, the present disclosure includes a dispenser vane comprising a flexible outer surface and a plurality of flexible teeth arranged along the length of the outer surface. The flexible outer surface and flexible teeth are radially moveable.

20 Claims, 20 Drawing Sheets

(56) References Cited

U.S. PATENT DOCUMENTS

| | | |
|---|---|---|
| 5,132,914 A | 7/1992 | Cahlander et al. |
| 5,207,506 A | 5/1993 | Musseau et al. |
| 5,386,762 A | 2/1995 | Gokey |
| 5,809,872 A | 9/1998 | Sundquist |
| 6,276,560 B1 | 8/2001 | Belcastro |
| 7,174,830 B1 | 2/2007 | Dong |
| 7,325,485 B2 | 2/2008 | Carhuff et al. |
| 7,762,181 B2 | 7/2010 | Boland et al. |
| 8,560,334 B2 | 10/2013 | Laehteenmaeki |
| 8,672,187 B2 | 3/2014 | Ophardt |
| 8,909,800 B1 | 12/2014 | Grebenschikov et al. |
| 8,948,912 B2 | 2/2015 | Nakamoto et al. |
| 9,424,602 B2 | 8/2016 | Taniguchi et al. |
| 9,563,372 B2 | 2/2017 | Hwang et al. |
| 9,767,096 B2 | 9/2017 | Goldberger et al. |
| 9,815,191 B2 | 11/2017 | Oleynik |
| 9,883,768 B2 | 2/2018 | Starflinger |
| 9,940,797 B2 | 4/2018 | Lamb et al. |
| 10,127,783 B2 | 11/2018 | Laska et al. |
| 10,241,726 B2 | 3/2019 | Hwang et al. |
| 10,518,409 B2 | 12/2019 | Oleynik |
| 10,601,860 B2 | 3/2020 | Mihan et al. |
| 10,686,620 B2 | 6/2020 | Gould et al. |
| 11,017,624 B2 | 5/2021 | Jain et al. |
| 2004/0173103 A1 | 9/2004 | Won |
| 2005/0193901 A1 | 9/2005 | Buehler |
| 2007/0106422 A1 | 5/2007 | Jennings et al. |
| 2009/0180843 A1 | 7/2009 | Jackson et al. |
| 2011/0018406 A1 | 1/2011 | Hartsfield, Jr. et al. |
| 2011/0090756 A1 | 4/2011 | Farrell et al. |
| 2011/0168797 A1 | 7/2011 | Reeves |
| 2013/0279288 A1 | 10/2013 | Dong et al. |
| 2015/0290795 A1 | 10/2015 | Oleynik |
| 2016/0052770 A1 | 2/2016 | Ratti |
| 2016/0081515 A1 | 3/2016 | Aboujassoum et al. |
| 2016/0179935 A1 | 6/2016 | Bhattacharjya et al. |
| 2016/0338545 A1 | 11/2016 | Shah et al. |
| 2017/0011442 A1 | 1/2017 | Hu et al. |
| 2017/0139902 A1 | 5/2017 | Byron et al. |
| 2017/0221296 A1 | 8/2017 | Jain et al. |
| 2017/0328997 A1 | 11/2017 | Silverstein et al. |
| 2018/0183860 A1 | 6/2018 | Majumdar |
| 2018/0206060 A1 | 7/2018 | Yazdani et al. |
| 2018/0253459 A1 | 9/2018 | Srinivasan Natesan et al. |
| 2018/0262388 A1 | 9/2018 | Johnson et al. |
| 2019/0033312 A1 | 1/2019 | Merbl et al. |
| 2019/0308318 A1 | 10/2019 | Jain et al. |
| 2019/0310611 A1 | 10/2019 | Jain et al. |
| 2020/0090099 A1 | 3/2020 | Johnson et al. |
| 2020/0118400 A1 | 4/2020 | Zalewski et al. |

OTHER PUBLICATIONS us.misumi-ec.com .pdf—Rubber Properties. (Website and .pdf found at https://us.misumi-ec.com/pdf/fa/2010/p2121.pdf) (Year: 2022).*

Extended European Search Report dated Dec. 17, 2021 for EP Application # 19781332, 10 pages.

C. H. Yun, et al., "Intelligent Management of Remote Facilities through a Ubiquitous Cloud Middleware," 2009 IEEE International Conference on Cloud Computing, 2009, 7 pages.

C. Shih, et al., "Virtual Cloud Core: OpenCL Workload Sharing Framework for Connected Devices," 2013 IEEE Seventh International Symposium on Service-Oriented System Engineering, 2013, 8 pages.

D. Sulaiman, et al., "MAMoC: Multisite Adaptive Offloading Framework for Mobile Cloud Applications," 2017 IEEE International Conference on Cloud Computing Technology and Science (CloudCom), 2017, 8 pages.

International Search Report and Written Opinion dated Jun. 14, 2019 for PCT/US2019/025421, 8 pages.

International Search Report and Written Opinion from PCT Application No. PCT/US2017/016298, dated Apr. 4, 2017; 3 pages.

M. F. M. Fuzi, et al., "Virtual desktop environment on Cloud Computing Platform," 2014 IEEE 5th Control and System Graduate Research Colloquium, 2014, 5 pages.

Montgomery, J., "Is the Domino's Pizza Tracker Real?" The Huffington Post, retrieved from http://www.huffingtonpost.com/rev-joel-montgomery/dominos-pizza-tracker_b5947734.html, last updated Dec. 7, 2014, pp. 1-6.

* cited by examiner

DISPENSER VANE

CROSS REFERENCE TO RELATED APPLICATIONS

This application is a continuation of, and claims the benefit of priority to, U.S., patent application Ser. No. 16/782,981, filed Feb. 5, 2020, which is a continuation-in-part of, and claims the benefit of priority to, U.S. patent application Ser. No. 16/051,052, filed Jul. 31, 2018, which claims priority to U.S. Provisional Patent Application No. 62/652,740, filed Apr. 4, 2018. The entire contents of which are incorporated herein by reference.

BACKGROUND

The present disclosure relates to apparatuses, systems, and methods of dispensing, and in some embodiments, to a dispenser vane for an automated robotic system.

Dispensers are typically used to store and deliver items. One challenge with creating a reliable dispenser is the ability to control the amount of material that is delivered. This is particularly challenging when the material is food, for example, such as solid chucks of fruits. Another challenge with creating a reliable dispenser is that the materials cannot get stuck inside the system. For automated delivery systems, ensuring that there are no jams and that repeatable quantities of materials can be delivered reliably may be paramount.

The present disclosure introduces a solid dispenser mechanism that may be used to reliably deliver repeatable quantities of items, such as food items.

SUMMARY

In one embodiment, the present disclosure includes a dispenser vane comprising a flexible outer surface and a plurality of flexible teeth arranged along the length of the outer surface. The flexible outer surface and flexible teeth are radially moveable.

The following detailed description and accompanying drawings provide a better understanding of the nature and advantages of the present disclosure.

DETAILED DESCRIPTION

In the following description, for purposes of explanation, numerous examples and specific details are set forth in order to provide a thorough understanding of the present disclosure. Such examples and details are not to be construed as unduly limiting the elements of the claims or the claimed subject matter as a whole. It will be evident to one skilled in the art, based on the language of the different claims, that the claimed subject matter may include some or all of the features in these examples, alone or in combination, and may further include modifications and equivalents of the features and techniques described herein.

Figure 1:
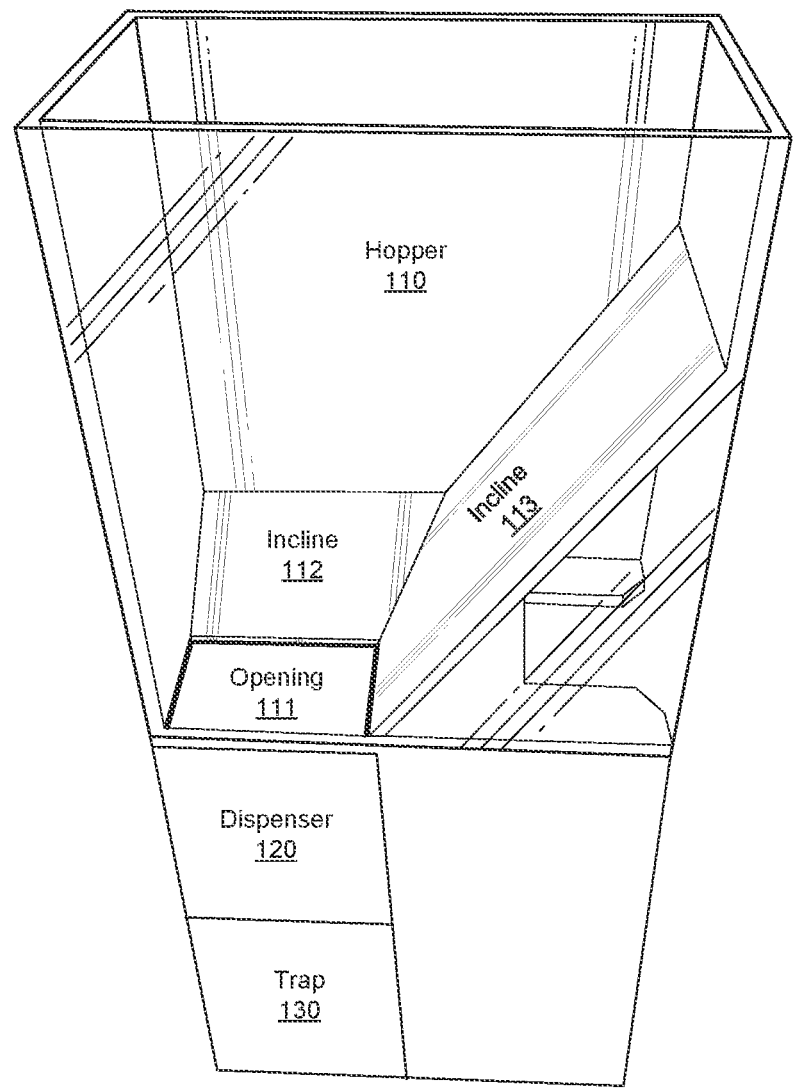
FIG. 1 illustrates a dispenser apparatus according to one embodiment.

FIG. 1 illustrates a dispenser apparatus according to one embodiment. The dispenser apparatus may include a hopper 110, a dispenser unit 120, and a trap unit 130, for example. The dispenser unit may be coupled to the hopper to receive the components to be dispensed. In this example, the trap is configured below the dispenser and the hopper 110 is configured above the dispenser 120. The hopper 110 is coupled to the dispenser 120 at an opening 111 in the bottom of the hopper 110 and a corresponding opening in the top of the dispenser 120 described in more detail below.

The hopper may hold components to be dispensed (aka ingredients), such as food ingredients, for example. The food ingredients may be frozen or fresh ingredients, either whole pieces or with different size cuts, for example. In this example, the hopper includes a minor incline 112 and major incline 113. An upper opening in the top of the hopper 110 may be larger than the lower opening 111 in the bottom of the hopper so that the hopper can hold a larger amount of ingredients to be dispensed, for example. In this example, the major incline 113 directs the ingredients from at least one side of the hopper 110 toward one side of the lower opening 111 in the bottom of the hopper. Additionally, in this example, the minor incline 112 directs the ingredients from at least another side of the hopper 110 toward one side of the lower opening 111 in the bottom of the hopper. Opening 111 is exposed to a dispenser unit 120 to allow ingredients to smoothly flow from the hopper to the dispenser. In this example, the hopper 110 may be rectangular to allow multiple such structures to be placed adjacent to each other for efficient dispensation of multiple ingredients using limited space along a particular surface (e.g., optimizing space where units are placed side-by-side for access by a robotic system).

Figure 2:
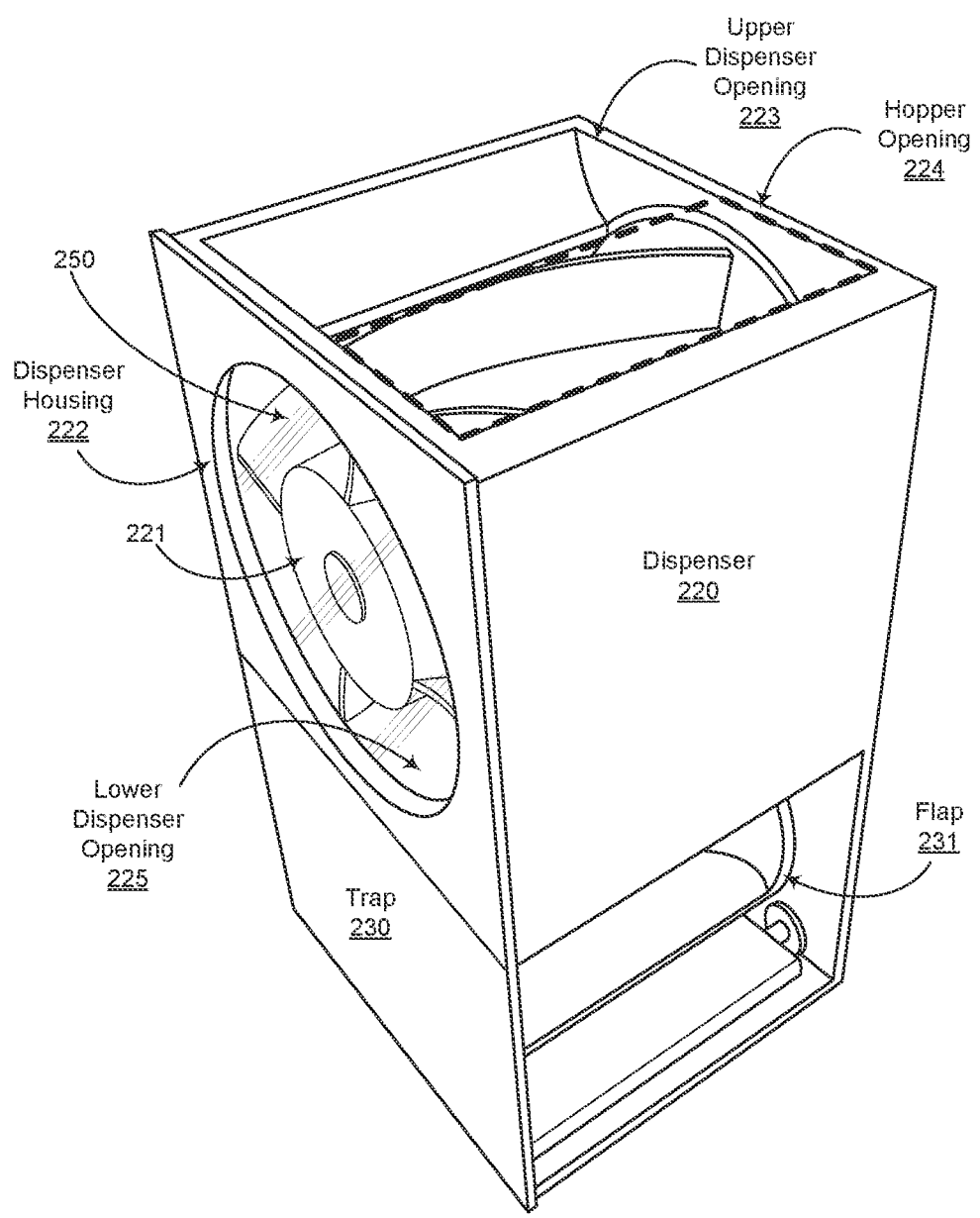
FIG. 2 illustrates another view of a dispenser unit coupled to a trap unit according to another embodiment.

FIG. 2 illustrates another view of a dispenser unit 220 coupled to a trap unit 230 according to another embodiment. This view illustrates the rotational nature of a dispenser element 221 and its configuration within the dispenser housing 222 of the dispenser unit 220. Hopper opening 224 is aligned with an upper opening 223 of dispenser 220 so that ingredients from the hopper may move into the channels created between the dispenser element 221 and dispenser housing 222. As described in more detail below, the dispenser element 221 is rotated (e.g., by a motor controlled by a computer) to move a controlled amount of ingredients through the channels and into a lower opening 225 in the dispenser housing 222 and into the trap unit 230. In one embodiment, the lower opening 225 of the dispenser 222 is coupled to an upper opening in the trap 230. The trap 230 includes a flap 231 comprising a hole. As described in more detail below, in a first closed position, the hole may extend horizontally (side-to-side), and a sidewall of the flap 231 forms a barrier between the upper opening of the trap 230 to stop movement of ingredients from dispenser 220, for example. In a second open position, the hole may extend vertically (top-to-bottom) to create passage (or vertical channel) between the upper opening of the trap 230 and a lower opening of trap 230 to allow movement of ingredients from dispenser 220, through the trap 230, and to a physical interface where a receptacle may be positioned to receive the ingredients exiting the trap, for example. In the following Figures and description, it is to be understood that dispenser 220 may or may not include a transparent material 250 (e.g., glass or plastic) to form a window (here, circular) to view the operation of the dispenser element 221, for example.

Figure 3:
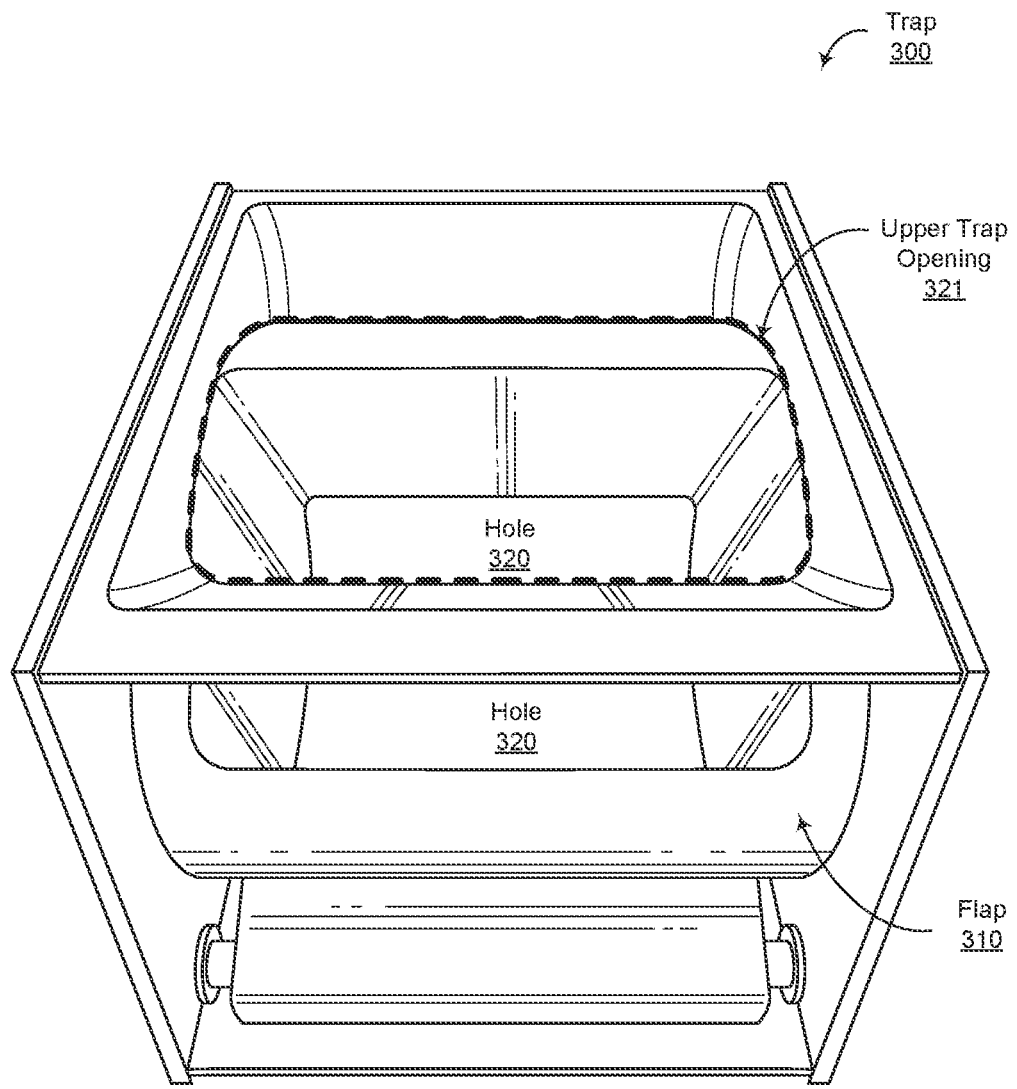
FIG. 3 illustrates an example trap according to one embodiment.

FIG. 3 illustrates an example trap 300. The trap 300 includes a flap 310 which can be rotated to create a passage (or hole) 320 from an upper opening to a lower opening of the trap. In one example embodiment, the trap is configured below the dispenser element such that when the flap is in a home position, the passage is closed and no amount of the ingredients passes from the dispenser through the trap (the top opening is closed). In this example, the flap is a cylinder having a central hollow region forming a rectangular hole 320. When the flap is in a first position where the rectangular hole is in a horizontal position, the trap is closed, and there is no pathway from an upper opening of the trap to a lower opening of the trap. However, when the flap is in a second position where the rectangular hole is rotated into a vertical position, the trap is open, and there is a pathway from the upper opening of the trap to the lower opening of the trap. In one embodiment, the upper opening 321 in the trap and the lower opening in the trap (not shown) are rectangular and approximately the same size (e.g., aligned in position, size, and cross-sectional shape) as the rectangular hole in the flap to minimize the impedance of ingredients flowing through the trap, for example. In this example, the internal passage of the flap 310 forms a rectangular chamber with rounded edges and the upper and lower trap openings have the same rectangular shape and rounded edges to align with the hole in the flap. In another embodiment, the trap may be integrated with a weighing scale that provides feedback (e.g., to a server or a control unit) about the quantity of product that has been dispensed.

Figure 4:
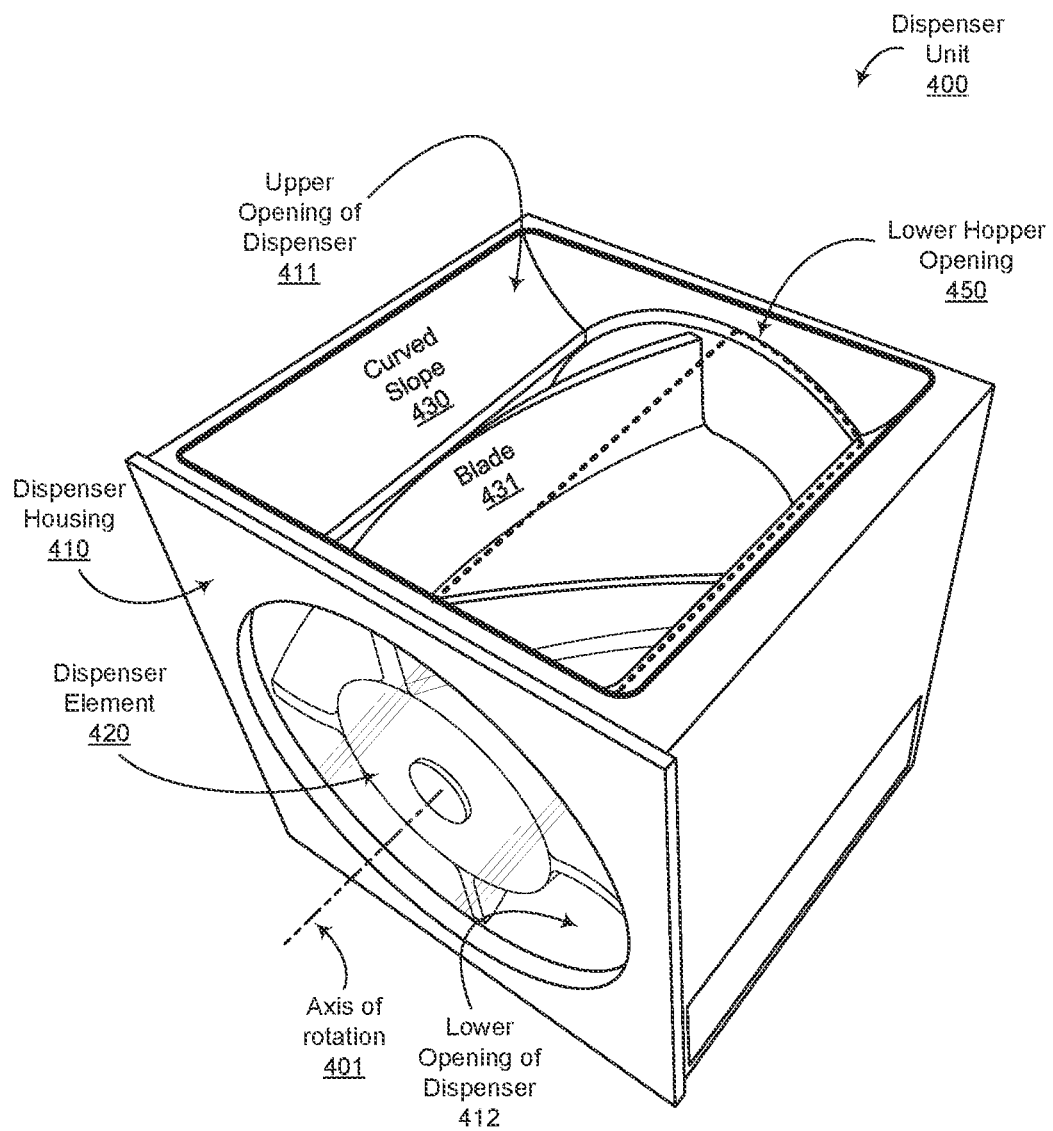
FIG. 4 illustrates a dispenser unit according to one embodiment.

FIG. 4 illustrates a dispenser unit 400 according to one embodiment. The dispenser unit includes a housing 410 and a dispenser element 420. The dispenser element 420 is coupled about a horizontal axis of rotation 401. The housing 410 has an upper opening 411 coupled to a lower opening 450 of the hopper (not shown) to receive ingredients and a lower opening 412 in which the ingredients exit the dispenser. The dotted line approximately indicates the proximate location of an interface between opening 450, which would be formed by the minor and major inclines at the bottom of the hopper (see FIG. 1), and the upper opening 411 of the dispenser housing. In this example, the upper opening 411 of dispenser 400 has curved sloping surface 430 from an outer opening to an edge forming an inner opening, which intersects with blades 431 of the dispensing element 420 as described below. The blades 431 also intersect with the hopper opening to open and close channels through the dispenser unit from the hopper as described below. A rod may be coupled through the center of the dispenser element 420 and may be coupled to a stepper motor (not shown). The stepper motor may be coupled to a controller (not shown) which may control the rotational position of the dispenser element, which controls the amount of ingredients dispensed as described below.

Figure 5:
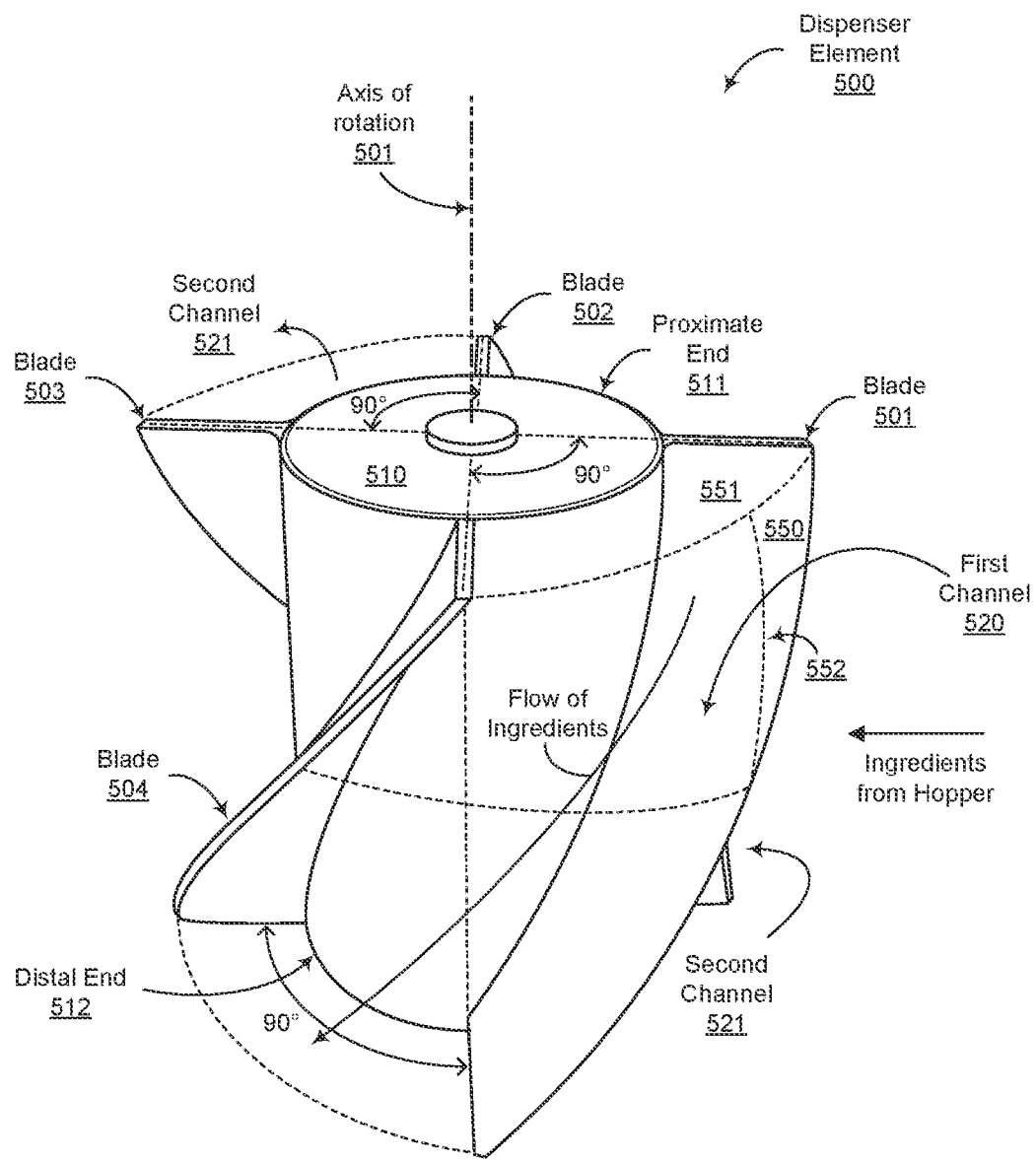
FIG. 5 illustrates the dispenser element according to one embodiment.

FIG. 5 illustrates the dispenser element 500 according to one embodiment. In this example, the dispenser element 500 includes four (4) blades 501-504 which form first and second channels 520 and 521. In this example, the channels are in opposite quadrants on opposite sides of the dispenser element. The 4 blades emanate from a cylindrical base 510 about the horizontal axis 501. The blades 501-504 emanate from the base 510 at a number of degrees (e.g., 90 degrees) from each other at a proximate end 511 of the cylinder 510. Two adjacent blades 501 and 504 of the four blades 501-504 form the first channel 520 and the other two adjacent blades 502 and 503 of the four blades 501-504 form the second channel 521. Ingredients from the hopper may flow from the top down (here, from the right to the left). The dispenser element 500 may be rotated back and forth (e.g., clockwise and then counter clockwise) between first and second degrees (e.g., from 0 to less than 90 degrees and back) to control the flow of items from an upper opening in the dispenser housing through the first and second channels and to a lower opening in the housing (see FIG. 4). As described in more detail below, FIG. 5 illustrates opening 550 formed by the blade 501, a sidewall 551 of the dispenser housing (not shown, but illustrated using a dashed line), and an edge 552 of the lower opening in the hopper (also not shown but illustrated using a dashed line). A similar triangular shaped channel opening may be formed for the second channel 521. As discussed below, the angle of rotation of the dispensing element may increase or decrease the size of channel openings 550 to control the amount of ingredients that flow into each channel and through the dispenser, for example.

In one embodiment, the first and second channels curve about the horizontal axis such that the first and second channels shift by a number of degrees (e.g., 90 degrees) from the proximate end 511 (e.g., the top in FIG. 5) to the distal end 512 (e.g., the bottom in FIG. 5) of the dispenser element 500.

In one example embodiment, the hopper incorporates an agitation mechanism that periodically agitates the product in the dispenser without dispensing the product such that the product stays in state that is easy to dispense. The frequency and the agitating mechanisms (e.g., circular motion with different blades, impact force along the back wall, etc . . . ) may be controlled by a combination of local and cloud servers in concert with the type of product in the hopper, for example.

Figure 6:
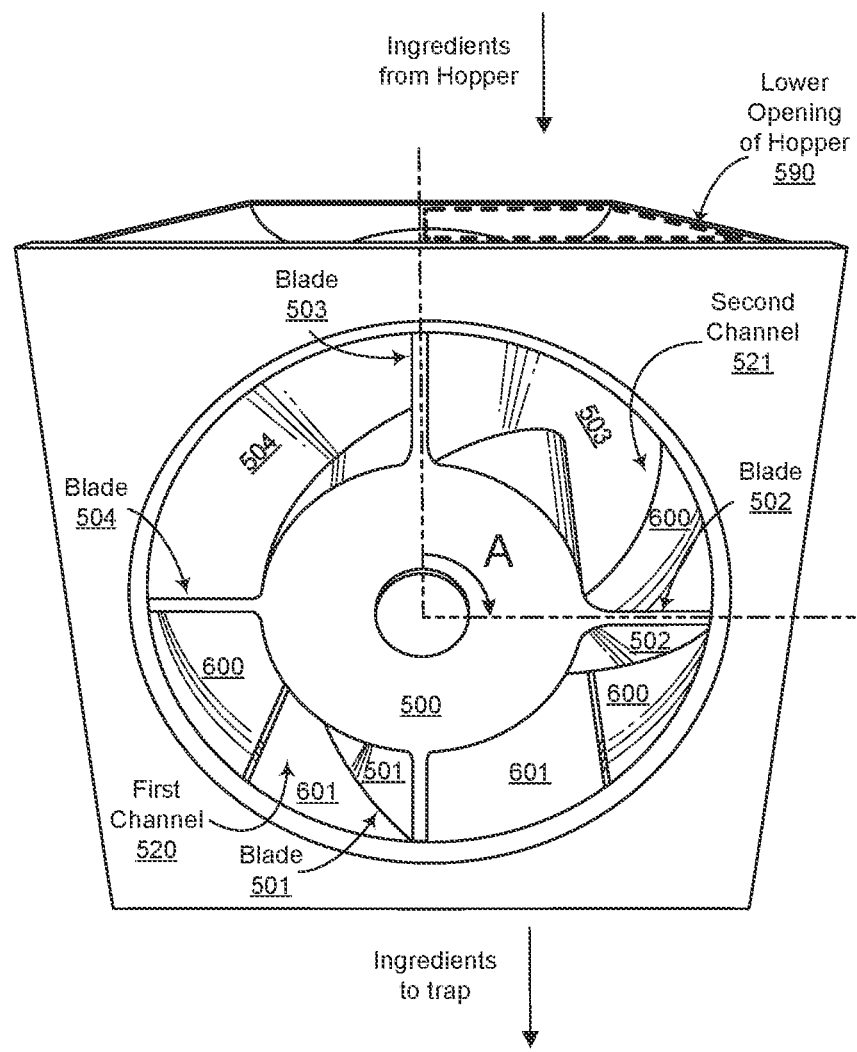
FIG. 6 illustrates a dispenser element in a first threshold position according to one embodiment.
Figure 8:
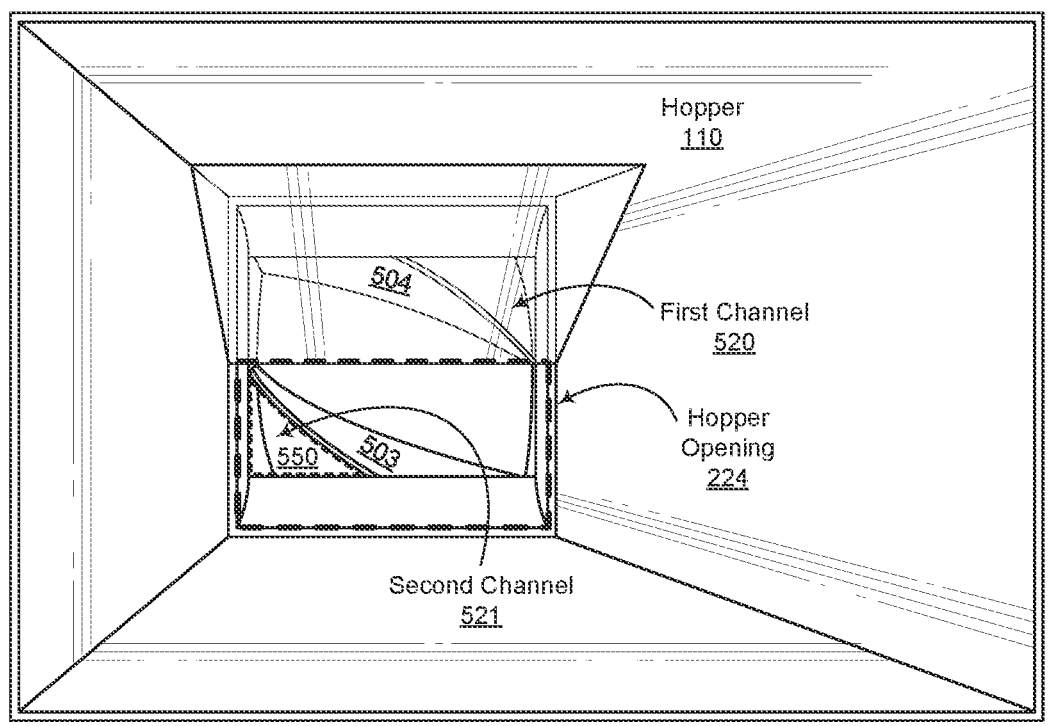
FIG. 8 illustrates a top view of a food dispenser apparatus according to one embodiment.

FIG. 6 illustrates a dispenser element 500 in a first threshold position in which the leading edge (here, blade 504) of the first channel 520 at the rear (and not visible) is at 0 degrees (relative to angle A). For example, blade 504 of the first channel 520 curves from the horizontal position in the front of the dispenser housing to the vertical position in the rear of the dispenser housing, where blade 504 may form a seal with incline 112 (FIG. 1) at the edge of the opening 590 (opening 111 in FIG. 1) defined by the hopper (See FIG. 8 showing a top view where the upper blade 504 of the first channel 520 is at the edge of the hopper opening 590 and the first channel 520 is closed). Additionally, blade 503 of the second channel 521 curves from the vertical position in the front of the dispenser housing to the horizontal position in the rear of the dispenser housing. Accordingly, blade 503 is also at the edge of the opening 590 defined by the hopper to form an opening 550 (in FIG. 5) into the second channel (See FIG. 8 showing a top view where the upper blade 503 of the second channel 521 is at the edge of the hopper opening 590 and the second channel 521 is fully opened). As the dispensing element is rotated (e.g., first clockwise and then counterclockwise) an input opening into the first channel may increase in size and the opening into the second channel may decrease in size. As ingredients enter each channel they may move through a channel formed by the sidewalls of the blades and the sidewall 600 of the dispenser housing toward the lower opening in the dispenser housing 601.

Figure 7:
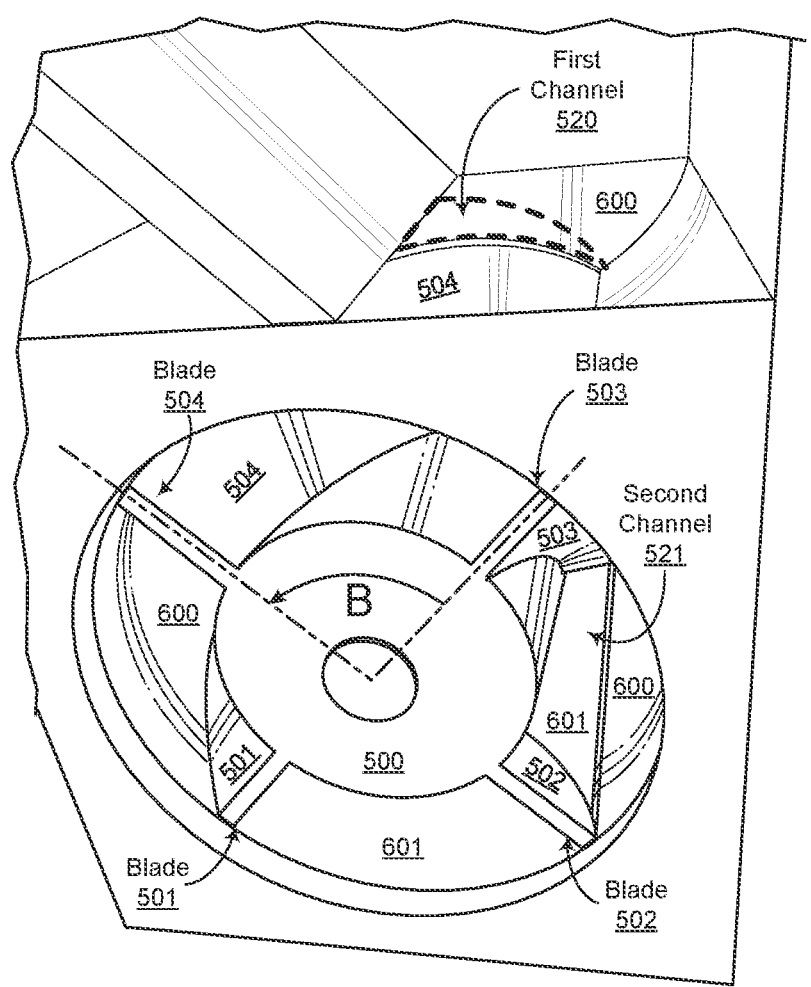
FIG. 7 illustrates a dispenser element in a second threshold position according to one embodiment.
Figure 9:
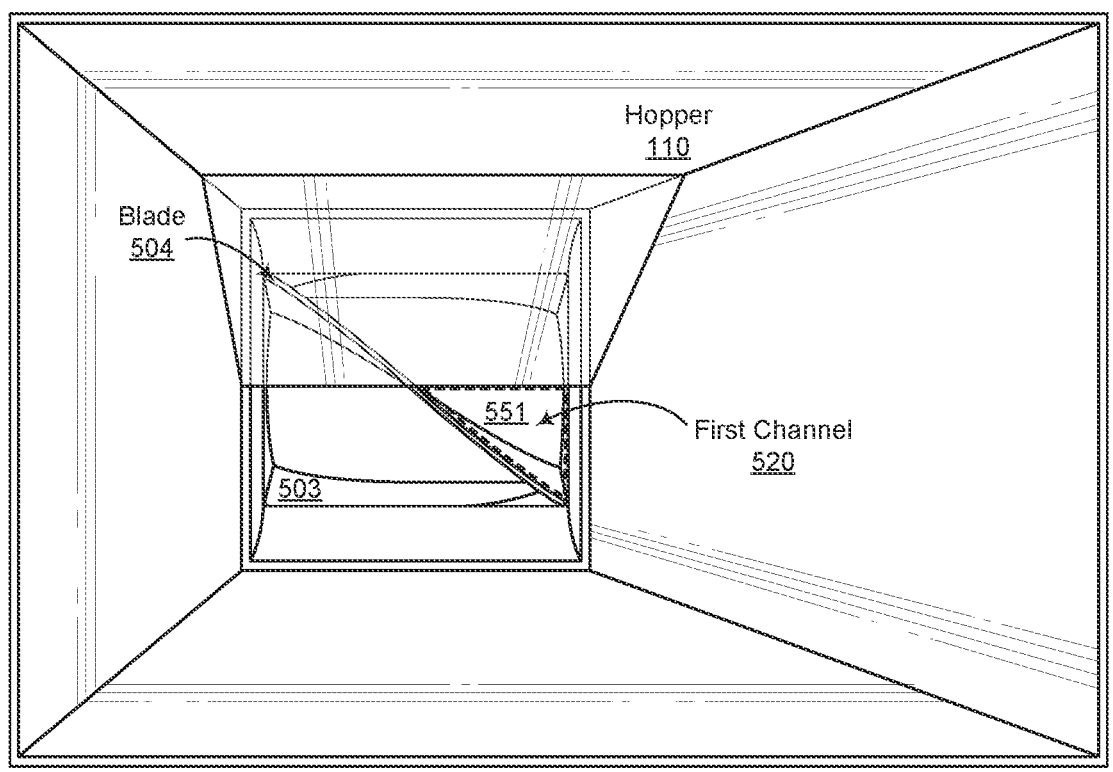
FIG. 9 illustrates a top view of an ingredient dispenser apparatus according to one embodiment.

FIG. 7 illustrates a dispenser element in a second threshold position in which the leading edge of the second channel 521 (blade 503) at the front (and visible) is at 0 degrees (relative to angle B). Since the upper blade 503 of the second channel 521 is adjacent to the upper opening of the dispensing unit, the second channel is closed in this position (See FIG. 9). More specifically, blade 504 of the first channel 520 curves from the shown position in the front of the dispenser housing to a position in line with the front position of blade 503 (90 degrees) in the rear of the dispenser housing, where blade 504 is at a second edge of the opening 590 defined by the hopper (See FIG. 9 showing a top view where the upper blade 504 of the first channel 520 is at a second edge of the hopper opening 590 and the first channel 520 is fully opened). Note that embodiments of the disclosure may include blades that are long enough to intersect the edge of the hopper incline 112 (FIG. 1) to seal the first channel, for example. Additionally, blade 503 of the second channel 521 curves from shown position in the front of the dispenser housing (zero degrees relative to angle B) to a position in line with the front position of blade 502 (90 degrees) in the rear of the dispenser housing. Accordingly, blade 503 is also at the same edge of the opening 590 as the rear portion of blade 504 (e.g., the edge of the opening 590 defined by the dispenser housing, See FIG. 9 showing a top view where the upper blade 503 of the second channel 521 is at the edge of the hopper opening 590 and the second channel 521 is fully closed). As the dispensing element is rotated (e.g., first counterclockwise and then clockwise) an input opening into the second channel may increase in size and the opening into the first channel may decrease in size.

FIG. 8 illustrates a top view of a dispenser apparatus according to one embodiment. FIG. 8 shows a dispenser unit view through the top of a hopper 110 in the first threshold position shown in FIG. 6. The position of the blade corresponds to FIG. 6, or with reference to FIG. 7 to a configuration where the dispensing element is rotated along angle B approximately 40-45 degrees which creates an opening minor B 550 which would allow ingredients to fall into the second channel 521. In this position, the first channel 520 may be close or have an opening so small that no ingredients may enter, for example. However, the rotation that opens the second channel 521 to the upper opening of the housing (e.g., hopper opening 224) also creates an opening in the first channel to the lower opening of the housing 601 (see FIGS. 6-7), allowing items to flow out of the first channel 520. Additionally, dispensing element 500 may be rotated such that there may be positions in which both the first and second channels have upper openings simultaneously. The size of the opening minor B for the second channel is approximately the same size as the lower opening for the first channel. Accordingly, the size of these openings, as set by the angle of rotation by a motor, for example, may be used to control the amount of items that flow through the channels.

FIG. 9 illustrates a top view of a dispenser apparatus according to one embodiment. FIG. 9 shows a dispenser unit view through the top of a hopper 110 in the second threshold position shown in FIG. 7. The position of the blade corresponds to FIG. 7, or with reference to FIG. 6 a configuration where the dispensing element is rotated along angle A approximately 40-45 degrees which creates an opening minor A 551 which would allow ingredients to fall into the first channel 520 but not the second channel Since no ingredients can enter the second channel, flow through the second channel is stopped. Additionally, referring again to FIG. 7, ingredients may enter the first channel but flow is stopped because the sidewalls of the dispensing unit housing extend at least 90 degrees between an upper opening of the housing and a lower opening of the housing. As shown in FIG. 7 the lower blade 501 of the first channel 520 is adjacent to the edge of the housing sidewall 600, thereby forming a seal in the first channel that prevents the flow of items from the upper opening to the lower opening of the dispensing unit. According, given the symmetry of the present example, when either the first or second channels are fully opened at the top of the dispensing unit to receive ingredients, they are also fully closed at the bottom of the dispensing unit to prevent ingredients from exiting the dispenser. Conversely, when either the first or second channels are fully closed at the top of the dispensing unit, they are also fully opened at the bottom of the dispensing unit so that ingredients may exit the dispenser. Similarly, the size of one input opening for one channel is typically the same size as an output opening of the other channel in this example.

Referring to FIGS. 6-9, the dynamic operation of the dispenser is as follows. Referring to FIG. 6, the first channel 520 may be selectively rotated into a position between 40 and 80 degrees from the first threshold position (e.g., in the direction of angle A) corresponding to a variable opening between the first channel 520 and the opening 590 (See FIG. 9 showing the first channel forming an opening 551 in the dispenser housing and bottom of the hopper). This allows a first amount of the ingredients to enter the first channel. If the angle of rotation is less than 45 degrees (A<45 degrees), for example, based on the configuration of the particular lower opening of the dispenser housing, the dispenser element may be in a position allowing the first amount of ingredients to exit the first channel and fall into the trap. This is illustrated in FIG. 6, for example, where the lower vertical blade 501 of the first channel maintains an opening to the trap up to about 45 degrees, where blade 501 intersects an edge of the lower opening 601 in the dispenser housing and the first channel 520 becomes closed at the bottom.

Referring to FIG. 7, the second channel 521 may be selectively rotated into a position between 40 and 80 degrees, for example, from the second threshold position (e.g., in the direction of angle B) corresponding to a variable opening between the second channel and the opening in the housing (See FIG. 8 showing the second channel forming an opening 550 in the dispenser housing and bottom of the hopper). This allows a second amount of the ingredients to enter the second channel. If the angle of rotation is less than 45 degrees (B<45 degrees), for example, based on the configuration of the particular dispenser housing lower opening, the dispenser element may be in a position allowing a second amount of ingredients to fall out of the second channel and into the trap.

In one example embodiment, the first and second channels are selectively rotated into a home position, which may be the position shown in FIG. 7, for example. In the home position, no amount of the ingredients passes through the dispenser unit. In one embodiment, the first and second openings created by moving the dispenser element clockwise and counter clockwise are configured to be the same so that approximately equal portions pass through each channel. The angle of rotation may further control the amount flowing into each channel, for example.

Advantageously, as mentioned above, the size of the channel inputs may be varied so that the system reliably delivers different amounts of repeatable quantities of ingredients. For example, one or more rotational movements may deliver a first amount of ingredients for a first use, and another one or more rotational movements may deliver a second amount of ingredients for a second use. This is particularly advantageous where the dispenser is used to dispense solid food items for consecutive orders which may use different amounts of ingredients, for example.

Figure 10:
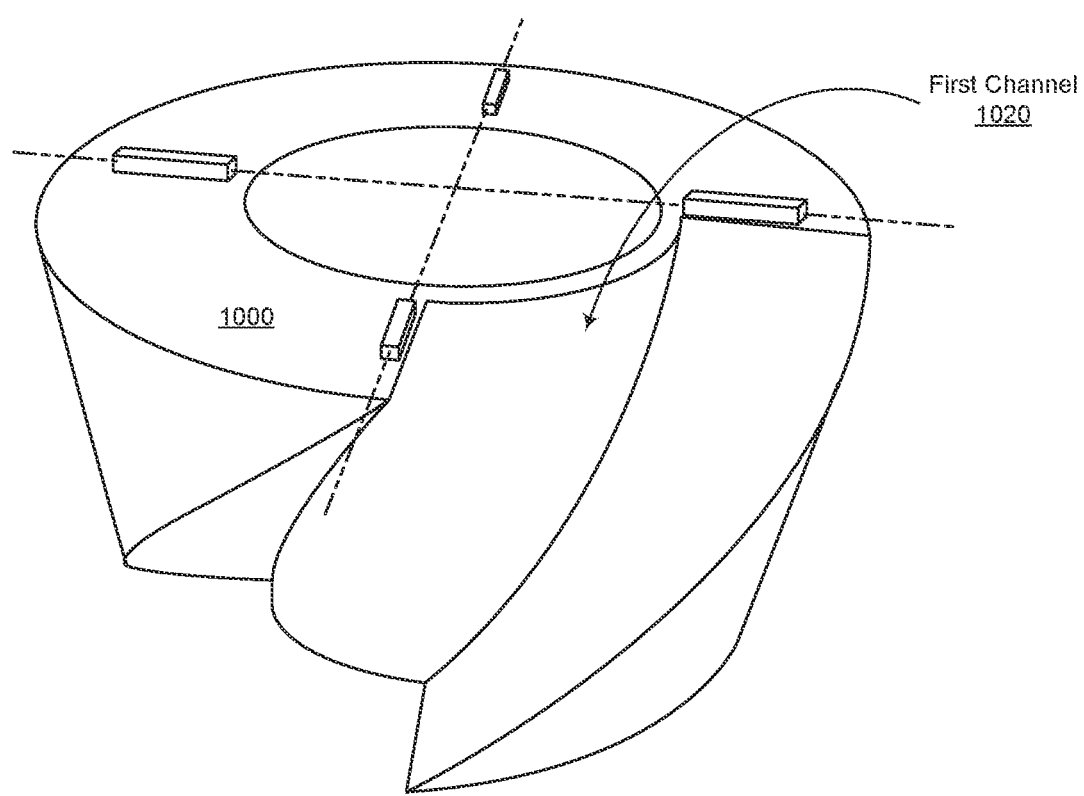
FIG. 10 illustrates another example dispenser element 1000 according to another embodiment.

FIG. 10 illustrates another example dispenser element 1000 according to another embodiment. The dispenser element has a first channel 1020. Other embodiments may further include a symmetrical second channel in an opposite quadrant on the opposing side of the first channel. In one embodiment, the first, or first and second, channels may operate similar to the dispenser element of FIG. 5. However, different shapes of first and second channels may be machined or molded such that the ingredients are less likely to stick and flow more effectively.

Figure 11:
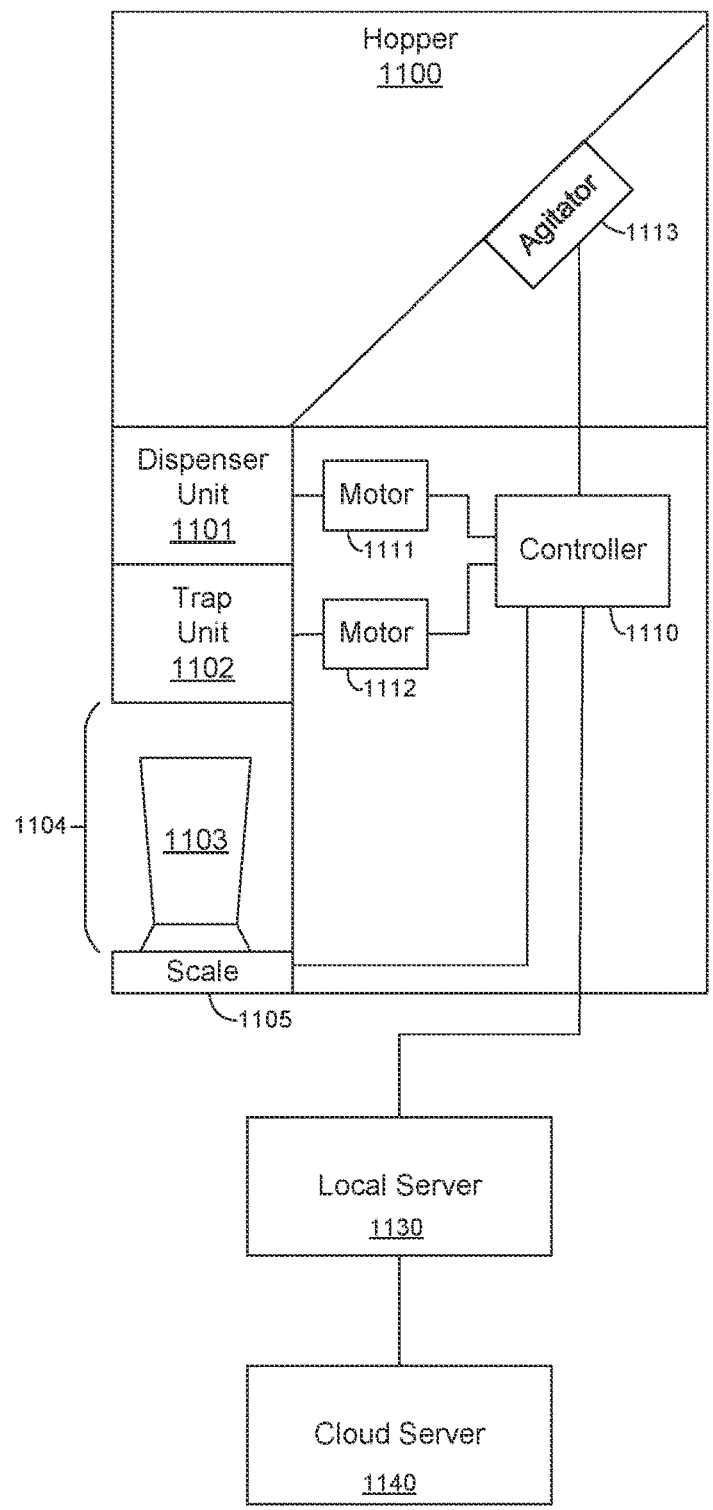
FIG. 11 illustrates a fully automated computer-controlled dispenser system according to an embodiment.

FIG. 11 illustrates a fully automated computer-controlled dispenser system according to an embodiment. This example illustrates a hopper unit 1100 coupled to a dispenser unit 1101, coupled to a trap unit 1102. Ingredients in the hopper move into the dispenser unit and through the trap as described above. The dispenser element in the dispenser unit may be controlled by a motor 1111 and a flap in trap unit 1102 may be controlled by a motor 1102, for example. Motors 1111 and 1112 are coupled to a controller 1110, which receives instructions from a server (e.g., local server 1130). Instructions from server 1130 may include an amount of ingredients to dispense, for example, which may have been received as part of are recipe from cloud server 1140, for example. The amount may be converted into a particular number of back and forth movements of the motor 1111 to move a dispenser element to dispense the amount in the instruction. In this example, a receptacle 1103 is placed (e.g., by a robotic arm) in a physical interface 1104 to receive ingredients that flow through the dispenser and through the trap. The receptacle 1103 may be placed on a scale 1105 to measure the weight of ingredients dispensed. Scale 1105 sends the weight of the dispensed ingredients to controller 1110 to form a feedback loop causing motor 1111 to rotate dispensing element to dispense more ingredients until a desired weight is obtained. In one embodiment, the weight measured on the scale is sent from the controller to the server, and the server continues to issue updated amounts to dispense until a desired weight is obtained, for example. For example, the controller may provide a feedback signal to the server with a weight measured by the scale such that the server responds to the weight of ingredients within the receptacle to configure the controller to dispense an updated weight of ingredients (e.g., a final weight less the weight measured by the scale). Motor 1112 may rotate the flap to configure trap 1102 in the open position at the beginning of a dispense operation, for example, and may configure trap 1102 in the closed position after a desired weight is obtained. For example, in response to a command from the server to the controller to dispense, the controller configures the motor to open the trap, and the controller closes the trap prior to responding to the server that the dispense operation is completed. Finally, this example illustrates the use of an agitator 1113 coupled to controller 1110. Agitator 1113 may include an electrical vibrator activated by controller 1110 to create vibrations in the hopper 1110 so that ingredients do not stick to the sidewalls or inclines of the hopper, for example.

Referring again to FIG. 7, in one embodiment, a second position a rotational difference from the home position (shown in FIG. 7) may be determined by a predetermined calibration factor corresponding to at least a size of the first channel, a desired amount of the ingredients, and/or a cut size of the ingredients, for example. This calibration factor may also include other positions as well. The calibration factor may comprise different values downloaded from a cloud server over the internet based on different ingredients of different sizes, for example. For instance, ingredients may be pineapple which has a chef's cut. Fruit of this cut may have been empirically characterized at the factory and a table of values may be ready for sending to each dispenser apparatus. In one embodiment, an initial calibration factor is loaded from the server to the controller to set a rotation value (e.g., amount of rotation for a given amount of a particular ingredient) and a cycle value (e.g., number of back and forth cycle) to deliver the desired weight of the items.

Additionally, different cut sizes of different ingredients may have different size dispenser elements. For example, a larger cut size may have a cylindrical base with a smaller radius and blades with correspondingly larger heights, where another smaller cut size may have a cylindrical base with a larger radius and blades with correspondingly smaller heights. Accordingly, in one embodiment, for a first size of items, the cylinder has a first diameter and the blades have a first radial length. In another embodiment, for a second size of items greater than the first size of items, the cylinder has a second diameter and the blades have a second radial length. The first diameter is greater than the second diameter and the first radial length is less than the second radial length.

In one embodiment, the dispenser element agitates (rotates back and forth) between two predefined positions to provide first and second amounts of ingredients. The two positions may be symmetrical because, as mentioned above, the input opening size of one channel at the upper opening may correspond to an output opening size of the other channel at the lower opening. This allows for alternating first and second channel dispensing of ingredients in succession.

This may provide for nearly equal quantized portions of the ingredient to be dispensed from each channel into the lower opening of the dispenser unit and through the trap, for example.

In yet another embodiment the first amount of an ingredient is an incremental amount, and the dispenser element agitates between the two positions through a predetermine number of cycles to provide a final amount of the ingredient.

In one embodiment, the dispenser apparatus includes a scale to measure the weight of the first amount of ingredients after falling out of the first channel. In one embodiment, a receptacle is situated to receive the items exiting the trap and a scale is situated to measure the weight of the receptacle and items located within the receptacle. In another embodiment, the value of weight is used to control the motor coupled to the dispensing element to dispense a final amount of the ingredients specified in an instruction received from the local server, for example.

In yet another embodiment, a controller is coupled to control a motor (e.g., a stepper motor) coupled to open and close the trap, and a server is coupled to the controller. In response to an instruction from the server to the controller to dispense, for example, the controller opens the trap, and the controller closes the trap prior to responding to the server that the dispense operation is completed.

In one embodiment, the scale provides a feedback signal to the controller such that the dispenser element responds to the weight of items within the receptacle in a local feedback loop to deliver a desired weight of the items. In another embodiment, a feedback loop between the dispenser and the local server may fine tune the weight of items in the receptacle.

In another embodiment, the dispenser apparatus includes a server coupled to the controller. An initial calibration factor is loaded from the server to the controller to begin an initial rotation value and cycle value to deliver the desired weight of the items.

Figure 12:
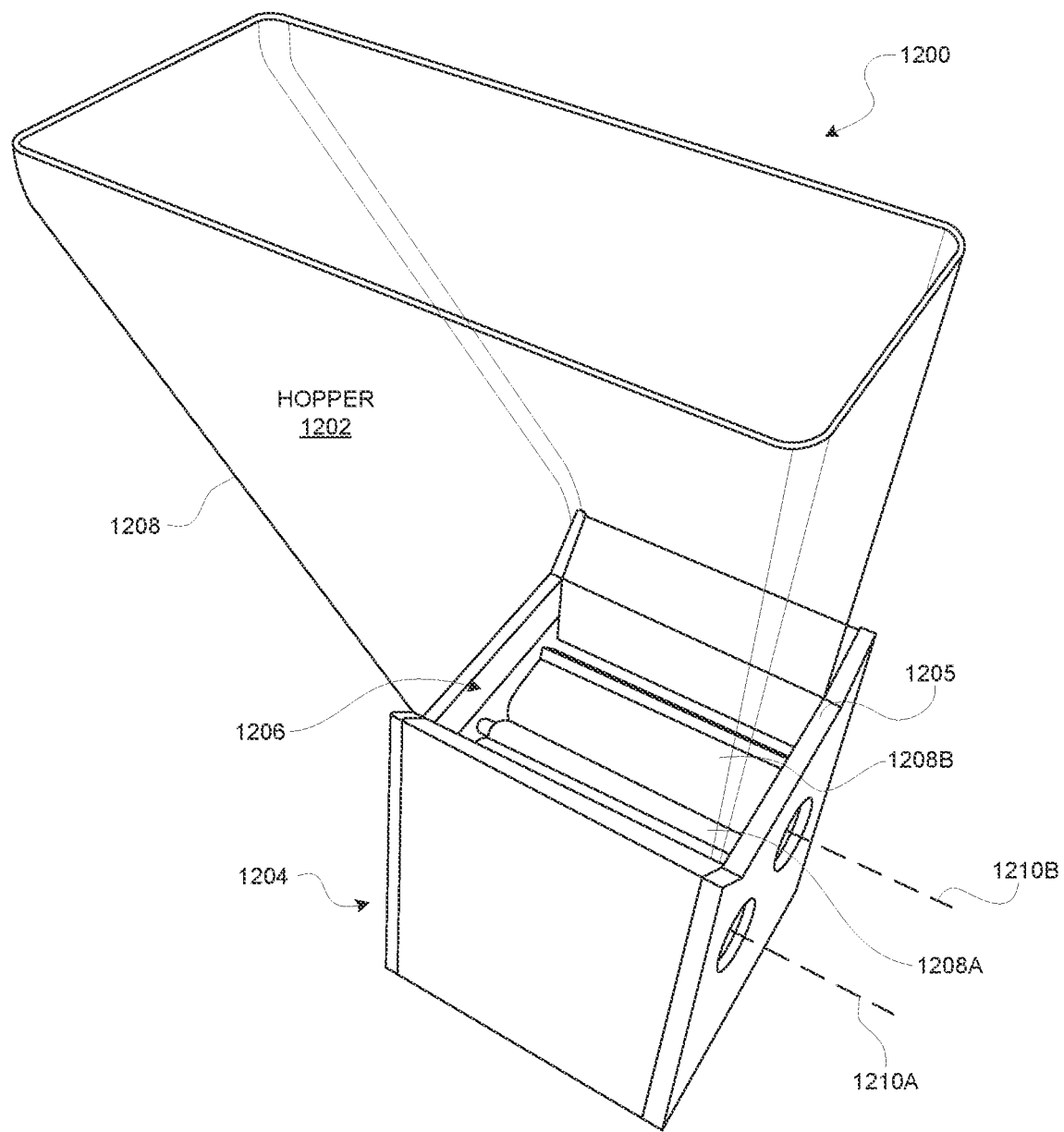
FIG. 12 is a perspective view illustrating a dispenser apparatus according to one embodiment of the present disclosure.

FIG. 12 is a perspective view illustrating a dispenser apparatus 1200 according to another embodiment of the present disclosure. In this embodiment, the dispenser apparatus 1200 includes a hopper 1202 and a dispenser 1204. The dispenser 1204 is coupled to the hopper 1202 to receive the components or ingredients to be dispensed. In this example, the hopper 1202 is configured above the dispenser 1204. The hopper 1202 is coupled to the dispenser 1204 at a lower opening 1206 in the bottom of the hopper 1202 and a corresponding opening in the top of the dispenser 1204 as described in more detail below.

As for the previously described embodiments, the hopper 1202 may hold components to be dispensed (aka ingredients), such as food ingredients, for example. The food ingredients may be frozen or fresh ingredients, either whole pieces or with different size cuts, for example. In this example embodiment of FIG. 12, the hopper 1202 includes an incline 1208. An upper opening in the top of the hopper 1202 may be larger than the lower opening 1206 in the bottom of the hopper so that the hopper can hold a larger amount of ingredients to be dispensed, for example. In this example, the incline 1208 directs the ingredients from at least one side of the hopper 1202 toward one side of the lower opening 1206 in the bottom of the hopper. The opening 1206 is exposed to the dispenser 1204 to allow ingredients to smoothly flow from the hopper to the dispenser. In this example, the hopper 1202 may have a rectangular top cross-section to allow multiple such structures to be placed adjacent to each other for efficient dispensation of multiple ingredients using limited space along a particular surface (e.g., optimizing space where units are placed side-by-side for access by a robotic system).

Figure 13:
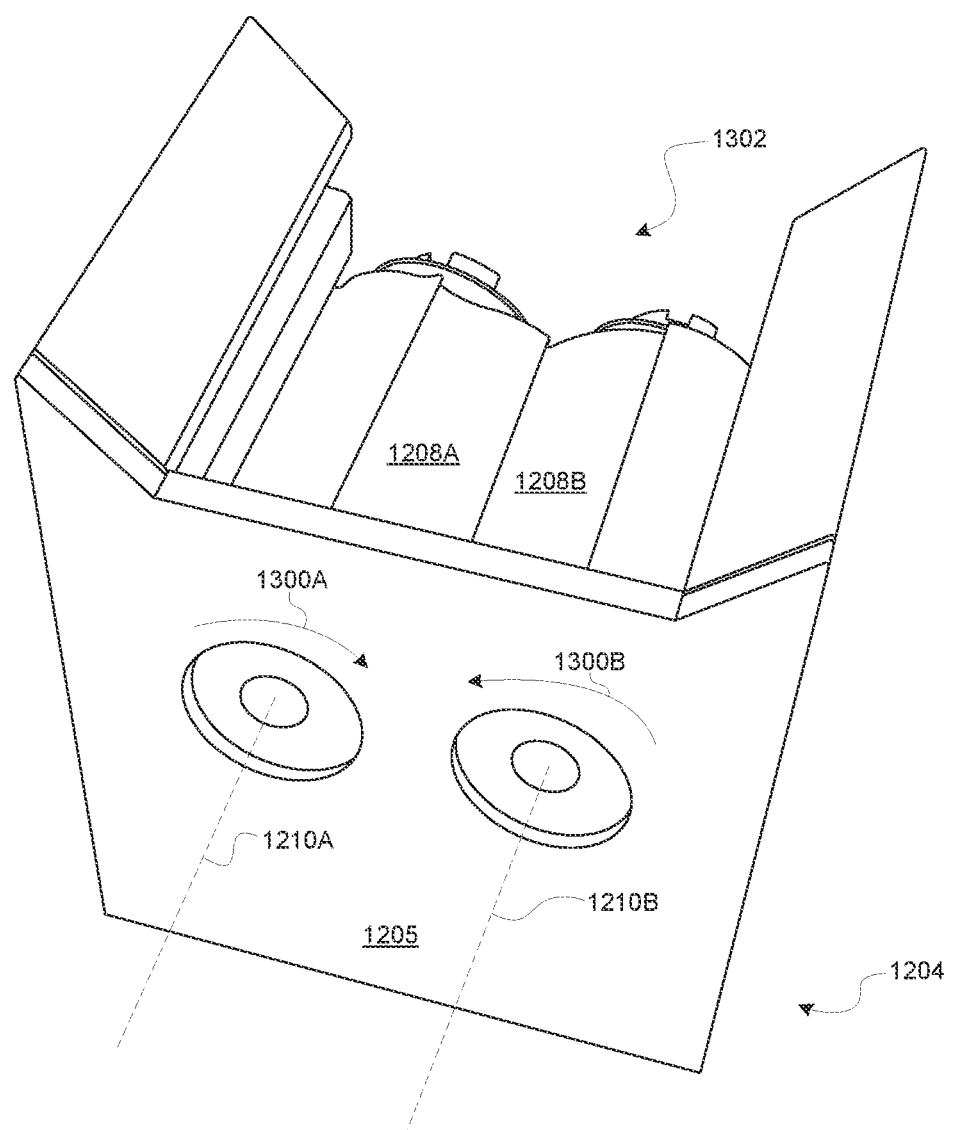
FIG. 13 is a perspective view illustrating the dispenser unit of FIG. 12 with the hopper removed according to one embodiment.

In the embodiment of FIG. 12, the dispenser 1204 includes a dispenser housing 1205 with two rotating dispensing vanes 1208A, 1208B arranged in the dispensing housing to rotate in opposing directions about parallel horizontal axes 1210A, 1210B to dispense ingredients from the hopper 1202, as will be described in more detail below. FIG. 13 is a perspective view illustrating the dispenser unit 1204 of FIG. 12 with the hopper 1202 removed and viewed from the right side in FIG. 12 according to one embodiment. This view illustrates the two dispensing vanes 1208A, 1208B positioned within the dispenser housing 1205 to rotate in opposing directions 1300A, 1300B about the parallel horizontal axes 1210A, 1210B. The lower opening 1206 (FIG. 12) of the hopper is aligned with an upper opening 1302 of dispenser 1204 so that ingredients from the hopper may move into a channel created between the dispensing vanes 1208A, 1208B, as will be described in more detail below.

In operation, the dispensing vanes 1208A, 1208B are rotated (e.g., by a motor or motors controlled by a computer) in opposing directions 1300A, 1300B (e.g., toward a channel between the vanes) about the parallel horizontal axes 1210A, 1210B to move a controlled amount of ingredients through the channel between the dispensing vanes to dispense this controlled amount of ingredients into a lower opening (not shown) of the dispenser housing 1205. In the present figures and description, it is to be understood that hopper 1202 and/or the dispenser 1204 may or may not include a transparent material such as glass or plastic to provide a view of the operation of the dispenser 1204.

Figure 14:
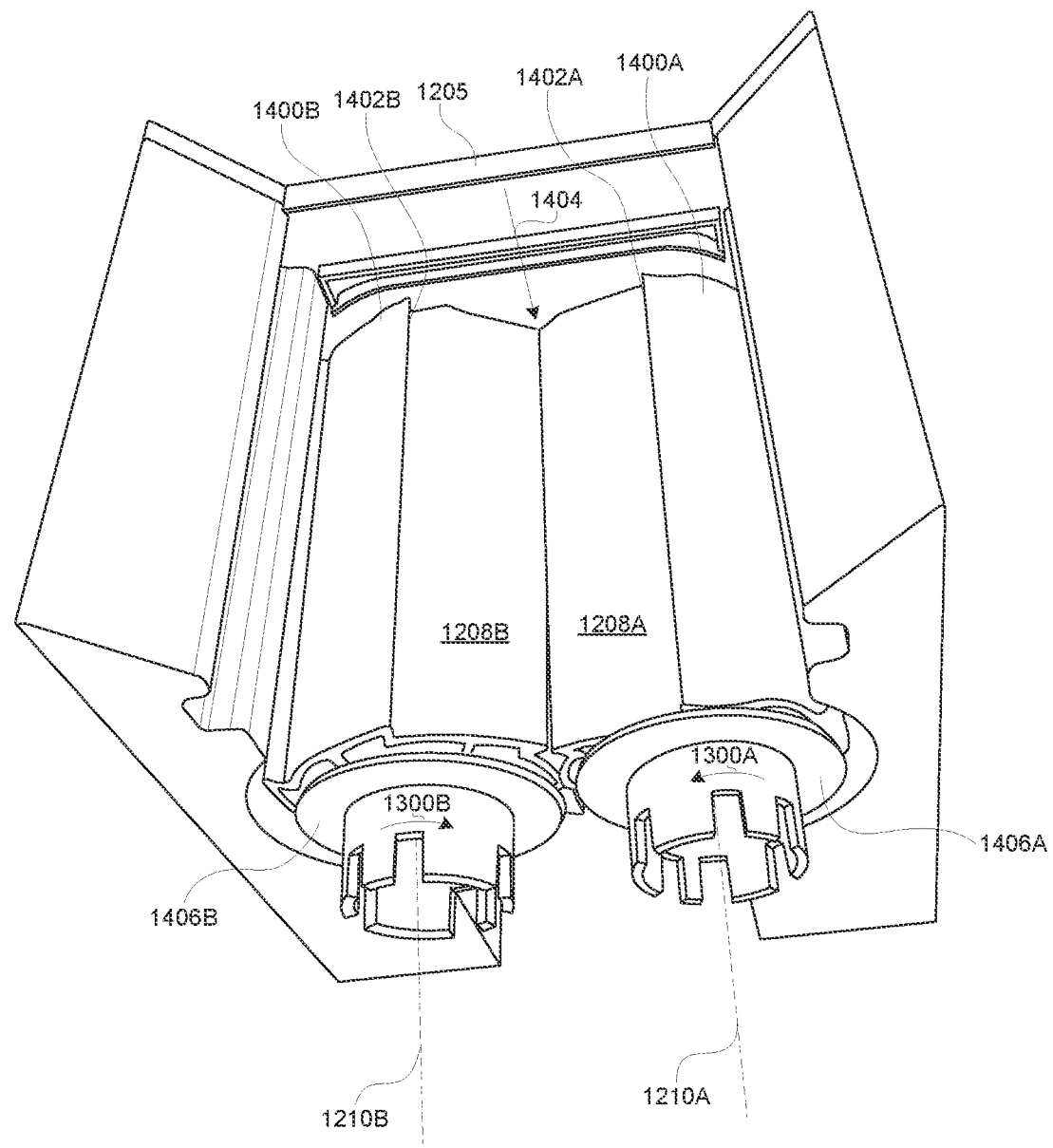
FIG. 14 is another perspective view of the dispenser of FIG. 12 illustrating the dispensing vanes in more detail according to one embodiment.

FIG. 14 is another perspective view of the dispenser unit 1204 of FIG. 12 with the hopper 1202 removed and viewed from the left side in FIG. 12 according to one embodiment. FIG. 14 further illustrates the dispensing vanes 1208A, 1208B arranged in the dispenser housing 1205 to rotate in opposing directions 1300A, 1300B about the parallel horizontal axes 1210A, 1210B. The dispensing vanes 1208A, 1208B include surfaces 1400A, 1400B with teeth 1402A, 1402B arranged on the surfaces. Each of the surfaces 1400A, 1400B is at a radial distance from the corresponding parallel horizontal axis 1210A, 1210B, as will be described in more detail below. A channel 1404 may be formed between the dispensing vanes 1208A, 1208B, and the dispensing vanes in rotated in opposing directions 1300A, 1300B toward the channel to move a controlled amount of ingredients into and through the channel and thereby dispense a desired amount of ingredients from the dispenser 1204. The dispensing vanes 1208A, 1208B are arranged in the dispenser housing 1205 on shafts 1406A, 1406B. The shafts 1406A, 1406B are rigid structures that may be driven by a motor or other structure (not shown) to rotate about the parallel horizontal axes 1210A, 1210B, and thereby rotate the dispensing vanes in the opposing directions 1300A, 1300B about these axes.

Figure 15:
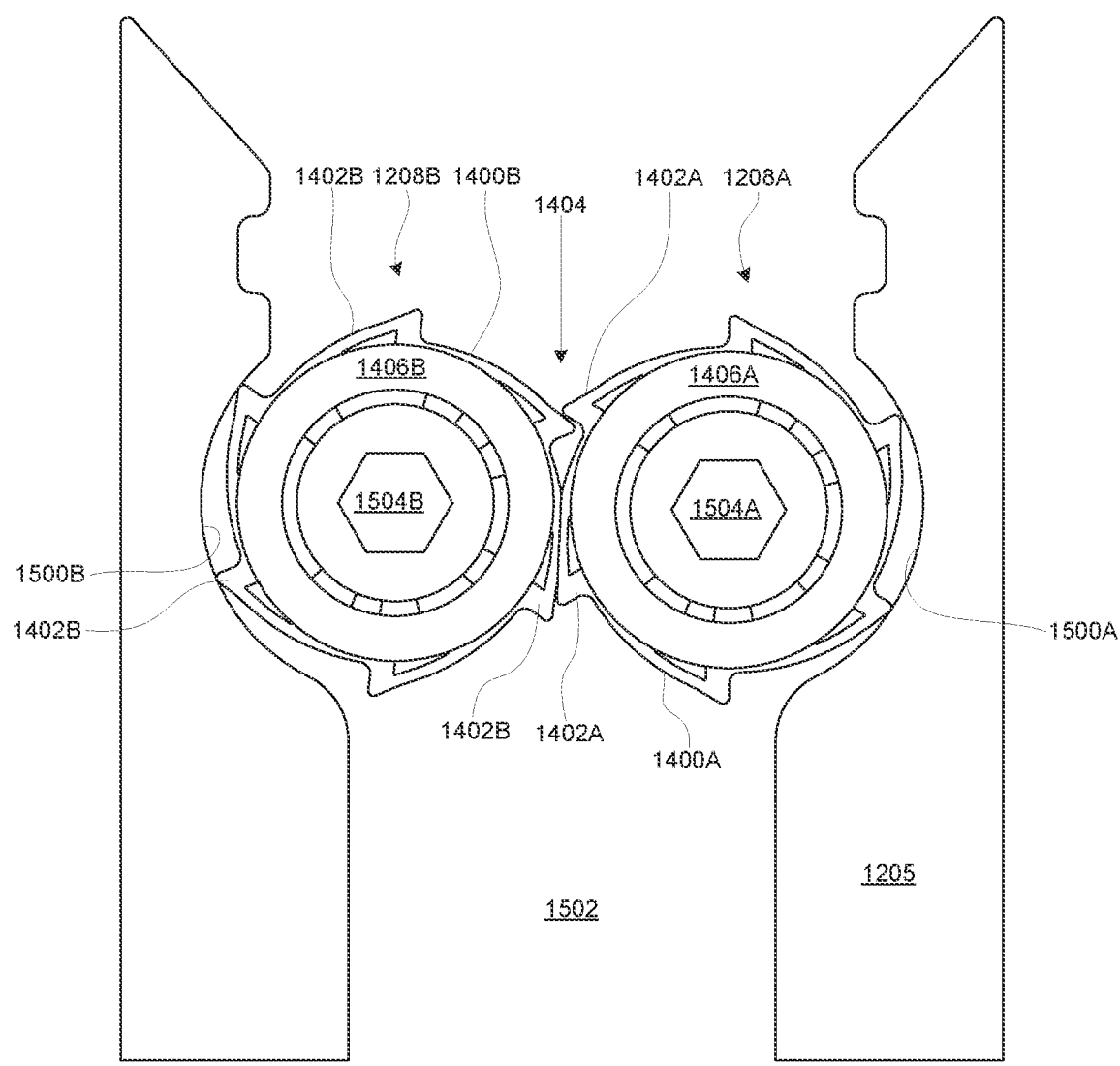
FIG. 15 is a side view illustrating in more detail the configuration and positioning of the dispensing vanes in a dispenser housing of the dispenser unit according to one embodiment.

FIG. 15 is a side view illustrating in more detail the configuration and positioning of the dispensing vanes 1208A, 1208B in the dispenser housing 1205 of the dispenser unit 1204 according to one embodiment. FIG. 15 illustrates in more detail the engagement of the dispensing vanes 1208A, 1208B in the channel 1404 and also illustrates engagement of the teeth 1402A, 1402B of the dispensing vanes with inner surfaces 1500A, 1500B of the dispenser housing 1205 to form a seal between the two. An ingredient chamber 1502 is formed in the dispenser housing 1205 under the channel 1404 between the two dispensing vanes 1208A, 1208B. Ingredients from the hopper 1202 (FIG. 12) are dispensed through the channel 1404 and into the ingredient chamber 1502, typically into a container (not shown) in or under the ingredient chamber. In the embodiment of FIG. 15, each of the shafts 1406A, 1406B includes a aperture 1504A, 1504B configured to receive a drive element of a motor (not shown) that drives the rotation of the shafts and thereby the corresponding dispensing vane 1208A, 1208B attached to the shaft. In this example, the apertures are hexagonal, but it is to be understood that other geometric shapes (e.g., other polygonal shapes) may be used.

Figure 16:
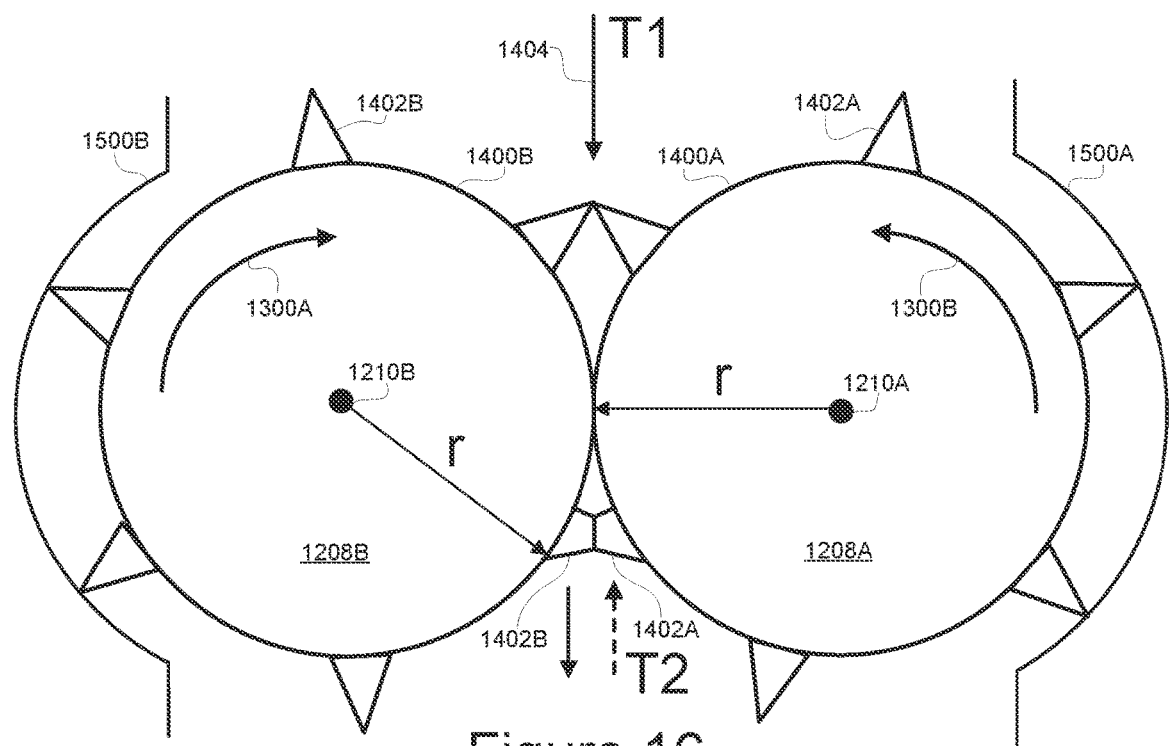
FIGS. 16 and 17 are functional diagrams illustration of the operation of the dispensing vanes of FIGS. 12-15 in dispensing ingredients from the hopper according to one embodiment.
Figure 17:
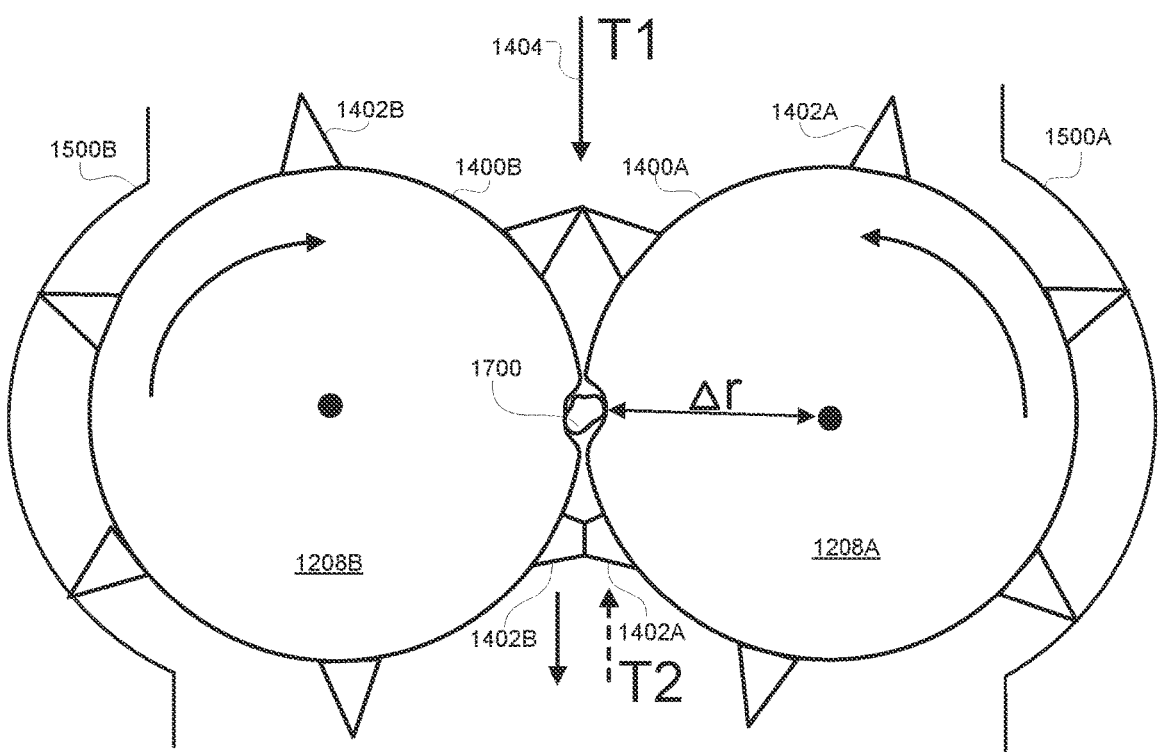

The operation of dispensing vanes 1208A, 1208B in dispensing ingredients from the hopper 1202 (e.g., FIG. 12) will now be described in more detail with reference to FIGS. 15, 16 and 17. FIGS. 16 and 17 are functional diagrams illustrating the operation of the dispensing vanes 1208A, 1208B of FIGS. 12-15 in dispensing ingredients from the hopper 1202 according to one embodiment. As seen in FIG. 16, each of the dispensing vanes 1208A, 1208B has a radial distance r corresponding to the distance between the parallel horizontal axes 1210A, 1210B and the ingredient surfaces 1400A, 1400B. The parallel horizontal axes 1210A, 1210B are spaced apart at a distance of twice the radial distance r (i.e., 2r=horizontal distance between parallel horizontal axes 1210A, 1210B). As a result, the ingredient surfaces 1400A, 1400B contact each other in the channel 1404 between the two dispensing vanes 1208A, 1208B. This is more clearly illustrated in the functional diagram of FIG. 16. In the functional FIGS. 16 and 17, each of the vanes 1208A, 1208B is shown as having a circular cross-section having the radial distance r. One or more of the dispensing vanes 1208A, 1208B may be formed from a flexible material. Accordingly, the system may accurately and reliably dispense solid and quasi-solid items, such as soft fruits and vegetables, which may be in various states between hard, semi-hard frozen to soft and only cold or semi-frozen, for example. It is to be understood that the shapes of surfaces 1400A, 1400B in various embodiments may not be precisely circular in cross-section or cylindrical in actual shape.

In one example embodiment, the dispensing vanes 1208A, 1208B are formed from a flexible material having a durometer value of approximately 80. The flexible material of the dispensing vanes 1208A, 1208B enables each of the surfaces 1400A, 1400B of the vanes 1208A, 1208B to move (or flex) radially, namely along radial direction inward towards and outward away from the parallel horizontal axes 1210A, 1210B. This radial movement of the surfaces 1400A, 1400B allows ingredients to be dispensed through the channel 1404 as the dispensing vanes 1208A, 1208B rotate. In some example embodiments, the teeth 1402A of vane 1208A may be configured to align with teeth 1402B of vane 1208. Accordingly, as the vanes rotate, the teeth of each vane may meet and engage each other in the channel 1404, for example. Because the teeth 1402A, 1402B project from the ingredient surfaces 1400A, 1400B, radial movement of the surfaces 1400A, 1400B also allows inward movement of the teeth 1402A, 1402B as the dispensing vanes 1208A, 1208B rotate and the teeth engage each through the channel 1404.

In operation, ingredients form the hopper 1202 are, through the force of gravity, forced downward in the hopper and received through the upper opening 1302 of the dispenser housing 1205. The ingredients accordingly are forced downward through the opening 1302 and onto the surfaces 1400A, 1400B of the dispensing vanes 1208A, 1208B. The dispensing vanes 1208A, 1208B are driven, such as by a motor or motors, to rotate in opposing directions 1300A, 1300B about the parallel horizontal axes 1210A, 1210B. As the dispensing vanes 1208A, 1208B rotate, the teeth 1402A, 1402B projecting from the ingredient surfaces 1400A, 1400B engage some of the ingredients and force the ingredients inward and downward to the channel 1404 between the dispensing vanes 1208A, 1208B. This is illustrated in FIG. 17, which shows an ingredient piece 1700 in passing through the channel 1404. The inward radial movement of the surfaces 1400A, 1400B is also shown in FIG. 17, and this radial movement is designated Δr in the figure.

Another aspect of embodiments of the dispensing vanes 1208A, 1208B will also be described with reference to FIGS. 15-17. As previously mentioned, the teeth 1402A, 1402B of the dispensing vanes 1208A, 1208B may be aligned to engage with each other in the channel 1404 as the vanes rotate and also engage with the inner surfaces 1500A, 1500B of the dispenser housing 1205 to form a seal between the two. FIGS. 16 and 17 also illustrate this engagement of the teeth 1402A, 1402B with the inner surfaces 1500A 1500B of the dispenser housing 1205. In addition to this seal formed between the surfaces and/or teeth 1402A, 1402B and the inner surfaces 1500A 1500B, a seal is also formed in the channel 1404 through the contact of the surfaces 1400A, 1400B and/or engagement of the teeth 1402A, 1402B. Example embodiments that include these two seals may be advantageous in maintaining a barrier between a first environment of the ingredients in the hopper 1202 and a second environment of the dispensed ingredients in the ingredient chamber 1502, which may be at a different temperature and/or humidity, for example.

Where the ingredients are food, such as fruits or vegetables, the first environment would typically be a lower temperature to refrigerate the food at an appropriate temperature. In contrast, the second environment may be a higher temperature with a different humidity. This is shown in FIGS. 16 and 17 as a first temperature T1 in the first environment and a second temperature T2 in the second environment, where T1 is less than T2. If the first and second environments are not isolated, humidity from the second environment could enter the first environment and freeze, potentially causing issues such as forming ice on components exposed in the first environment. The warmer temperature of the second environment may also result in wasted energy by undesirably warming the first environment. The two seals provided by the dispensing vanes 1208A, 1208B and the dispenser housing 1205 may advantageously provide effective isolation between the first and second environments to eliminate or reduce adverse consequences that can arise when the two environments are in communication or not isolated, for example.

Figure 18:
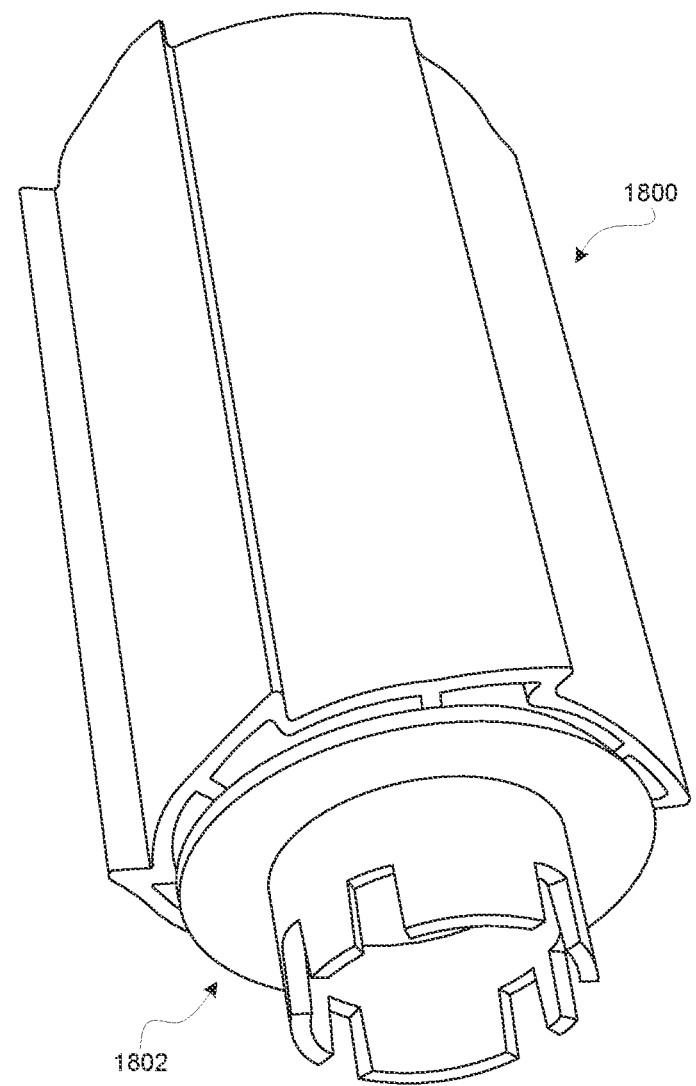
FIG. 18 is a perspective view of one of the dispensing vanes of FIGS. 12-15 according to one embodiment.
Figure 19:
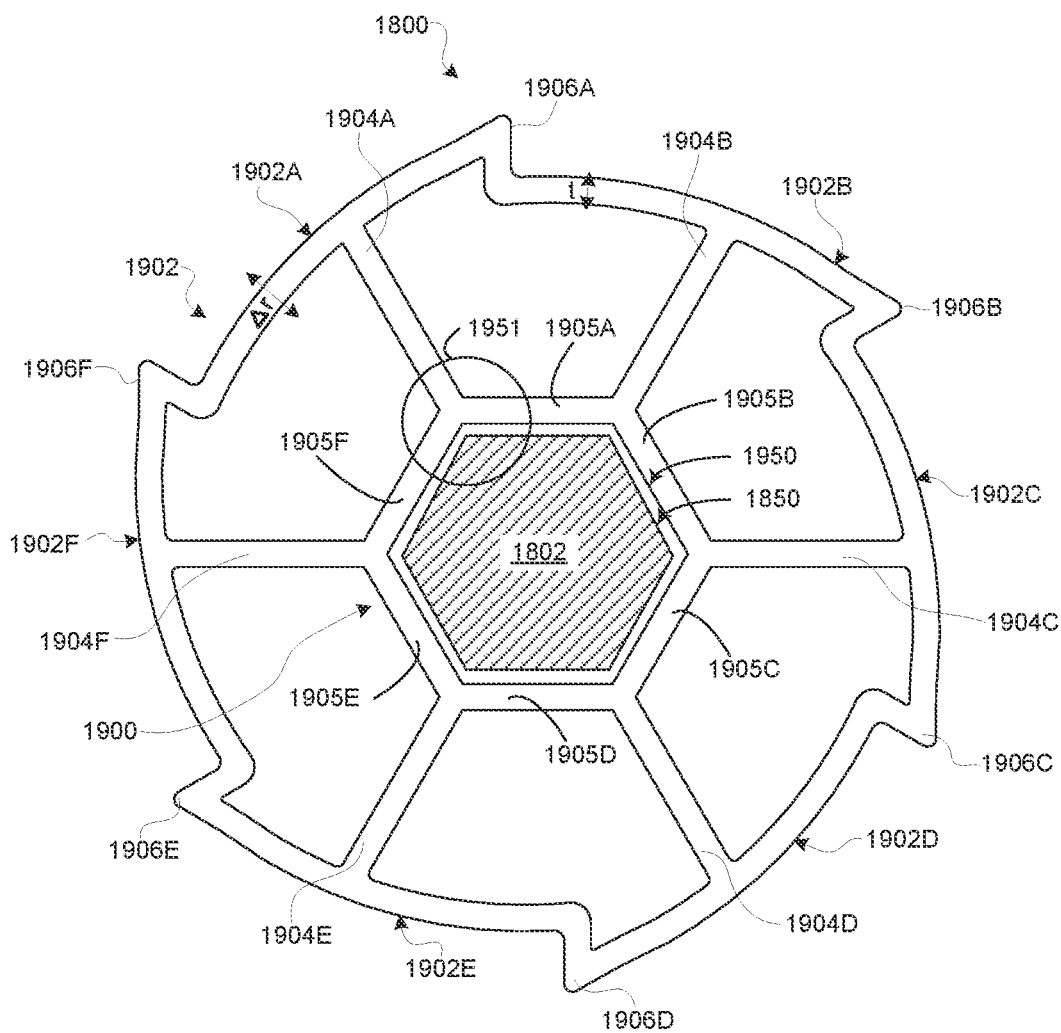
FIG. 19 is a side view of the dispensing vane of FIG. 18 illustrating in more detail the shaft coupled to the dispensing vane and the inner structure of the dispensing vane.

FIG. 18 is a perspective view of a dispensing vane 1800 according to one embodiment. The dispensing vanes 1208A, 1208B of the embodiments of FIGS. 12-17 each correspond to the dispensing vane 1800 in an embodiment of the present disclosure. The dispensing vane 1800 is shown on a corresponding shaft 1820 in FIG. 18. FIG. 19 is a cross-sectional view of the dispensing vane 1800 of FIG. 18 illustrating in more detail the shaft 1802 that drives the dispensing vane and the inner structure of the dispensing vane. In this example, the shaft 1802 is hexagonal having six flat surfaces. The dispensing vane 1800 in this example may include an inner aperture structure 1900 configured to receive the shaft 1802. In this example, the inner aperture structure 1900 is also hexagonal to receive the hexagonal shaft 1802 in the embodiment of FIGS. 18 and 19. For example, the inner aperture structure 1900 may include a plurality of interior surface segments (e.g., six surface segments 1905A-F) configured to engage an outer surface 1850 of shaft 1802 along an interior surface 1950. In this example, corners of the outer surface 1850 of shaft 1802 engage corners of interior surface 1950 as illustrated at 1951. Accordingly, rotation of shaft 1802 engages the vane 1800 to rotate the outer surface 1902. In this example it can be seen that a flexible dispensing vane 1800 may be placed on or removed from the rigid shaft 1802, which may advantageously facilitate replacement or repair of the vanes, for example. In this example, both the shaft 1802 and inner aperture structure 1900 are hexagonal, but it is to be understood that other shapes may be use.

Similarly, surface 1902 of the dispensing vane 1800 may also comprise the same geometric surface as interior surface 1950, which in this example is a hexagonal surface including six ingredient surface segments 1902A-1902F. The dispensing vane 1800 further includes radial segments 1904A-1904F, each radial segment extending radially between the inner aperture structure 1900 and the outer surface 1902. More specifically, each radial segment 1904A-1904F has a distal radial end coupled to a corresponding one of the six surface segments 1902A-1902F. The surface 1902 further includes teeth 1906A-1906F, each of the teeth disposed on a corresponding one of the surface segments 1902A-1902F. The outer surface 1902 may be substantially flat along the length of the vane, for example, and curved around the radial axis. In this example, the teeth are arranged between the distal radial ends of adjacent radial segments 1904A-1904F. Each of the teeth 1906A-1906F is disposed on the corresponding one of the surface segments 1902A-1902F, which in this example is at approximately a midpoint between the distal radial ends of the adjacent radial segments 1904A-1904F. Positioning the teeth 1906A-1906F allows the flexible radial movement of each tooth and the corresponding surface segment 1902A-1902F as the pair of dispensing vanes 1800 rotate and engaged pairs of teeth or items being dispensed that are rotating through the channel defined between the vanes, as discussed above in relation to the channel 1404 and dispensing vanes 1208A, 1208B of FIG. 15, for example. Adjacent radial segments (e.g., 1904F and 1904A) may further compress the area formed by surface segments (e.g., 1902A) and interior segments (e.g., 1905F) while maintaining a back pressure sufficient to form a seal between the vanes during rotation as mentioned above.

Figure 20:
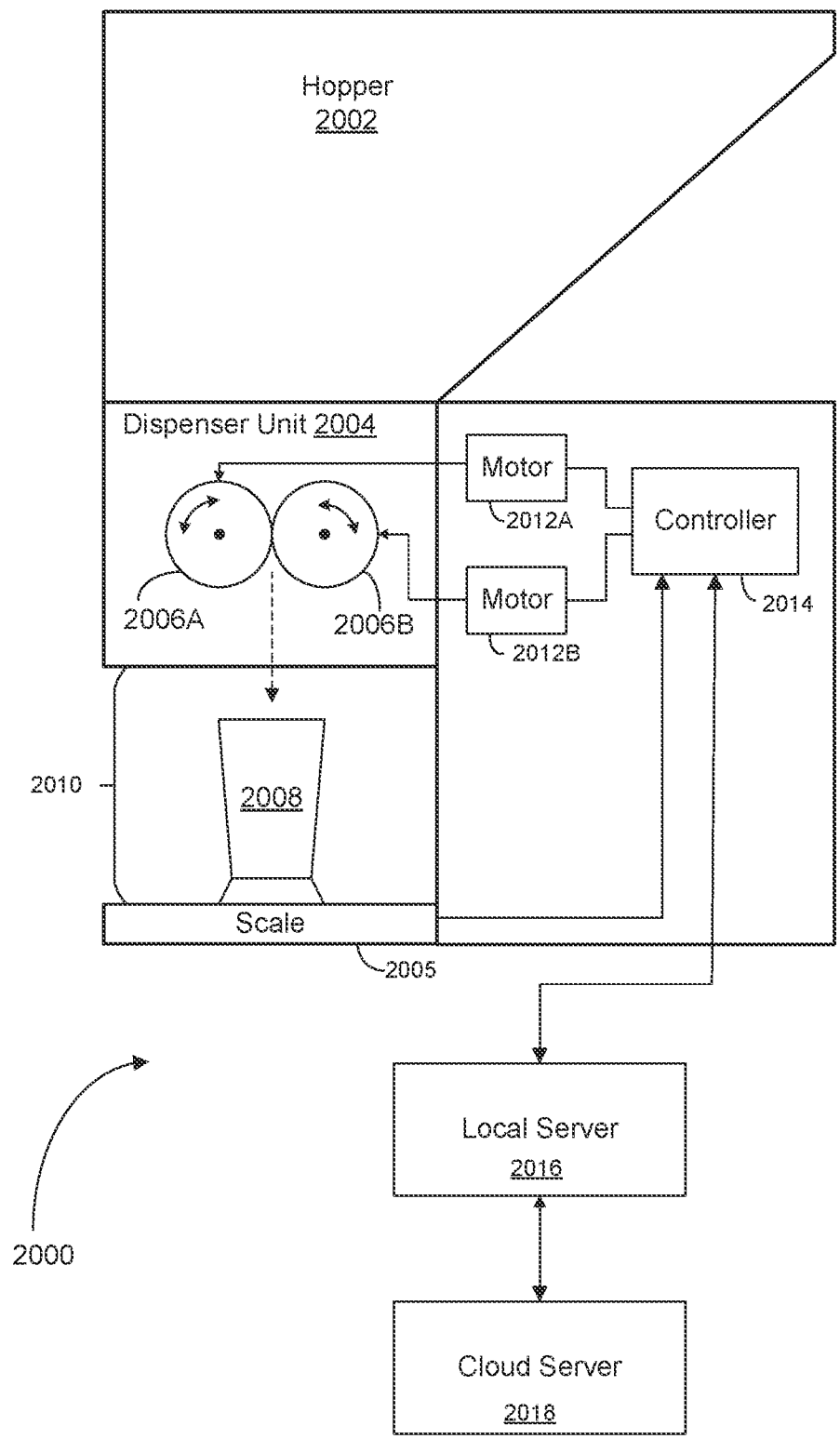
FIG. 20 is a functional diagram of a fully automated computer-controlled dispenser system according to another embodiment.

FIG. 20 is a functional diagram of a fully automated computer-controlled dispenser system according to another embodiment. FIG. 20 illustrates a fully automated computer-controlled dispenser system 2000 according to an embodiment. This example illustrates a hopper unit 2002 coupled to a dispenser unit 2004. The hopper 2002 and dispenser unit 2004 correspond to the hopper 1202 and dispenser unit 1204 of the embodiments of FIGS. 12-15 in one embodiment. Ingredients in the hopper 2002 move into the dispenser unit 2004 and through the dispenser unit 2004 as described above. The dispenser unit 2004 includes two dispensing vanes 2006A, 2006B that are controlled to rotate as described above by motors 2012A, 2012B. The motors 2012A, 2012B are coupled to a controller 2014, which receives instructions from a server (e.g., local server 2016). Instructions from server 2016 may include an amount of ingredients to dispense, for example, which may have been received as part of a recipe from cloud server 2018, for example. In this example embodiment of FIG. 20, a receptacle 2008 is placed (e.g., by a robotic arm) in a physical interface 2010 to receive ingredients that flow through the dispenser unit 2004. The receptacle 2008 may be placed on a scale 2005 to measure the weight of ingredients dispensed. Scale 2005 sends the weight of the dispensed ingredients to controller 2014 to form a feedback loop causing motors 2012A, 2012B to be controlled by the controller 2014 to rotate to dispense more ingredients until a desired weight is obtained. In one embodiment, the weight measured on the scale 2005 is sent from the controller 2014 to the server 2016, and the server continues to issue updated amounts to dispense until a desired weight is obtained, for example. For example, the controller 2014 may provide a feedback signal to the server 2016 with a weight measured by the scale such that the server responds to the weight of ingredients within the receptacle to configure the controller to dispense an updated weight of ingredients (e.g., a final weight less the weight measured by the scale). The controller 2014 also controls the motors 2012A, 2012B to reverse their respective directions of rotation if no ingredients, or an amount that falls below a minimum threshold of ingredients, are being dispensed by the dispenser unit 2004. In addition, the controller 2014 also controls the motors 2012A, 2012B to reverse their respective directions of rotation once a desired amount of ingredients as indicated by the scale 2005 has been dispensed.

Figure 21:
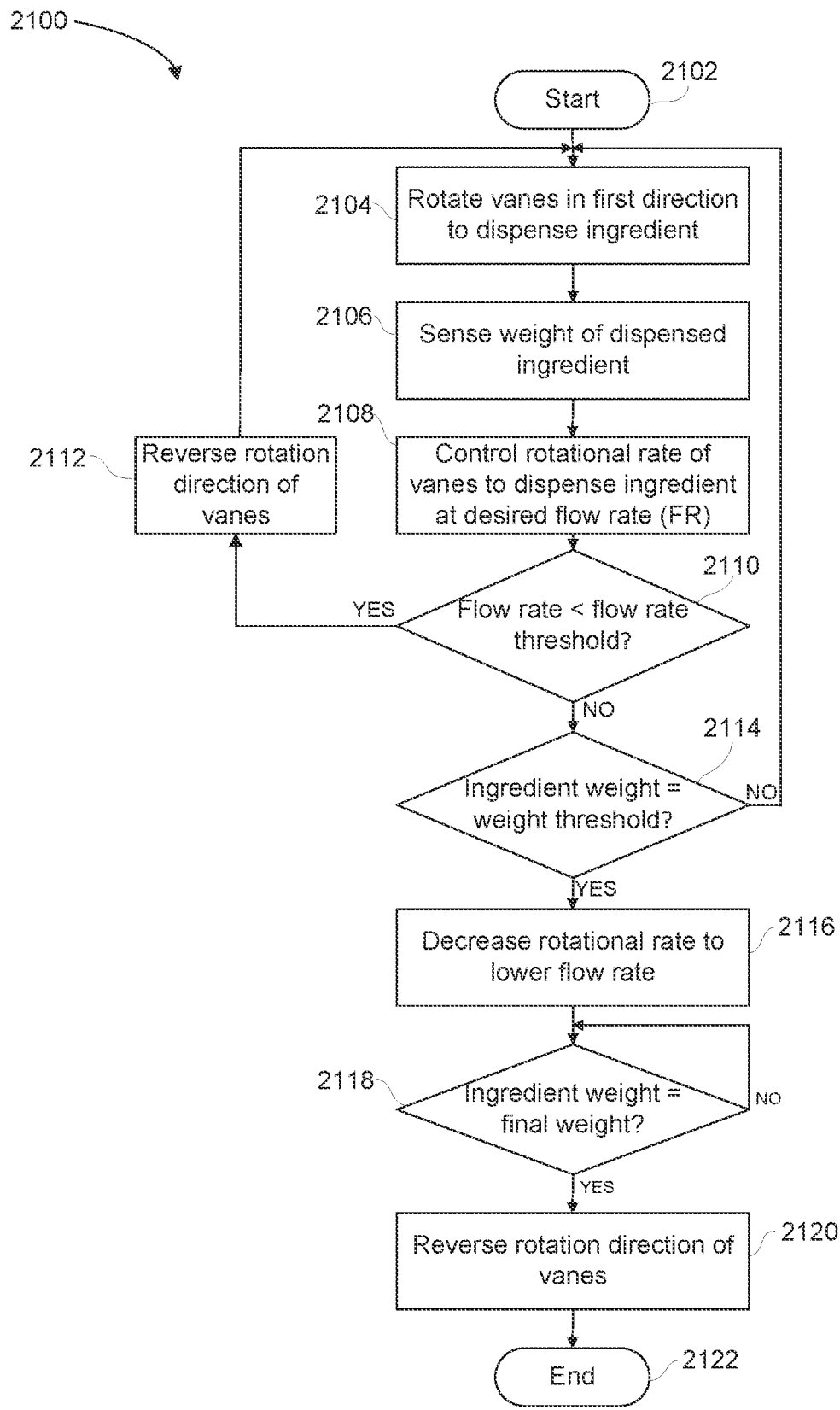
FIG. 21 is a flowchart illustrating in more detail the operation of the system of FIG. 20 according to one embodiment.

FIG. 21 is a flowchart illustrating a process 2100 executed by the controller 2014 in dispensing ingredients from the hopper 2002 according to one embodiment. FIG. 21 is a flowchart illustrating in more detail the operation of the system of FIG. 20 according to one embodiment. The process 2100 begins in step 2102 and proceeds immediately to step 2104 in which the controller 2014 controls the motors 2012A, 2012B to rotate the dispensing vanes 2006A, 2006B in first opposing directions to dispense ingredients from the hopper 2002. The dispensed ingredients from the dispenser unit 2004 are dispensed into the receptacle 2008 as indicated by the dashed arrow in FIG. 20. From step 2104, the process proceeds to step 2106 and the scale 2005 senses the weight of the dispensed ingredients from the dispenser unit 2004. The process then proceeds to step 2108 and the controller 2014 controls the motors 2012A, 2012B to rotate the dispensing vanes 2006A, 2006B at a rate that dispenses ingredients from the dispenser unit at a desired dispensing or flow rate FR. The control of the motors 2012A, 2012B and rotational rate of the dispensing vanes 2006A, 2006B will vary depending on the type of ingredients being dispensed.

From step 2108, the process proceeds to step 2110 and the controller 2014 determines whether the flow rate FR of the ingredients being dispensed from the dispenser unit 2004 is less than a minimum flow rate threshold $FR_{TH}$. The ingredients in the hopper 2002 can become clogged in the dispenser unit 2004, resulting in the dispenser unit not dispensing any ingredients, or dispensing ingredients at a minimum flow rate $FR_{TH}$ of the ingredients. Step 2110 detects such a situation. In this situation, if the determination in step 2110 is positive the process proceeds from step 2110 to step 2112 and the controller 2014 reverses the first opposing directions rotations of the dispensing vanes 2006A, 2006B to reverse the rotation of the dispensing vanes and rotate the vanes in second opposing directions in an attempt to thereby unclog the dispenser unit 2004. For example, if the first opposing directions correspond to the dispensing vane 2006A rotating clockwise and the dispensing vane 2006B rotating counterclockwise about their respective parallel horizontal axes, then in step 2112 the controller 2014 reverses these directions of rotation, causing the dispensing vane 2006A to rotate counterclockwise and the dispensing vane 2006B to rotate clockwise for a predetermined amount of time. After this predetermined amount of time, the process proceeds from step 2112 back to step 2104 and the controller 2014 once again controls the dispensing vanes 2006A, 2006B to rotate in the first opposing directions.

When the determination in step 2110 is negative, a sufficient amount of ingredients is being dispensed by the dispenser unit 2004. The process 2100 then proceeds from step 2110 to step 2114 and determines whether the weight of the dispensed ingredients as measured by the scale 2005 has reached a desired weight $W_{TH}$. If the determination in step 2114 is negative, the process goes back to step 2104 and the controller 2014 controls the motors 2012A, 2012B and dispensing vanes 2006A, 2006B to continue dispensing ingredients at the desired flow rate FR of the ingredients.

If the determination in step 2114 is positive, then the amount of the ingredients already dispensed into the receptacle 2008 equals a first weight threshold $W_{TH}$. The first weight threshold $W_{TH}$ has a value that is less than the desired final weight FW of the ingredients to be dispensed and in this way indicates that the amount of the ingredients dispensed is approaching the desired final weight FW of the ingredients. For example, the first weight threshold $W_{TH}$ may equal 90% of the final weight FW ($W_{TH}=(0.9 \times FW)$) of the ingredients being dispensed. When the determination in step 2114 is positive, indicating that the amount of the ingredients dispensed is approaching the desired final weight, the process proceeds to step 2116 and the controller 2014 controls the motors 2012A, 2012B and dispensing vanes 2006A, 2006B to reduce the flow rate of the ingredients being dispensed by the dispenser unit 2004. From step 2116, the process then proceeds to step 2118 and the controller 2014 determines whether the weight of the dispensed ingredients in the receptacle 2008 is equal to the desired final weight FW of the ingredients. If the determination in step 2118 is negative, the controller 2014 maintains the same control so that the dispenser unit 2004 continues to dispense the ingredients at the lower flow rate established in step 2116. Once the weight of the dispensed ingredients 1W in the receptacle 2008 is equal to the desired final weight FW, the determination in step 2118 is positive and the process proceeds to step 2120. In step 2120, the controller 2014 reverses the opposing directions of rotation of the dispensing vanes 2006A, 2006B to stop any more ingredients from being dispensed by the dispenser unit 2004. At this point, the desired final weight FW of the ingredients has been dispensed into the receptacle 2008 and the process proceeds to step 2122 and terminates.

In operation of the dispenser system 2000, there is a delay between the time between when ingredients have been dispensed by the dispensing unit 2004 and when the controller 2014 detects the weight of dispensed ingredients 1W via the scale 2005. This delay will result in more ingredients being dispensed than is desired unless compensated for. As a result, in one embodiment, the controller 2014 compensates for this delay by stopping the dispensing of the ingredients prior to the sensed weight of dispensed ingredients 1W from the scale 2005 reaching the desired final weight FW. The time in transit of ingredients from the dispensing unit 2004 to the receptacle, along with the delay time the weight sensed by the scale 2005, are utilized by controller 2014 to proceed to step 2120 and stop dispensing ingredients in advance of sensed dispensed weight 1W actually reaching the desired final weight FW. This results in the dispenser system 2000 more accurately dispensing ingredients that are more nearly equal to the desired final weight FW into the receptable 2008.

FURTHER EXAMPLES

In various alternative embodiments, the present disclosure may include apparatuses, methods, systems, and techniques in a variety of combinations. The following features and embodiments may be found alone or in various combinations with each other.

In one embodiment, the present disclosure includes an apparatus, comprising a dispenser unit comprising a plurality of dispenser vanes.

In one embodiment, dispenser vanes comprise a flexible cylindrical surface comprising a plurality of teeth, wherein the dispenser vanes are configured adjacent to each other to form at least one channel.

In one embodiment, when an ingredient passes through the channel, the flexible cylindrical surfaces of adjacent dispenser vanes flex in response to the ingredient.

In one embodiment, the dispenser vanes are rotated in opposite directions toward the at least one channel.

In one embodiment, the dispenser vanes form seals between adjacent dispenser vanes.

In one embodiment, the dispenser vanes form a seal between a dispenser vane and a dispenser housing.

In one embodiment, the apparatus further comprises a hopper to hold ingredients.

In one embodiment, a dispenser unit is coupled below the hopper to receive the ingredients through an opening in the hopper.

In one embodiment, the dispenser unit includes a housing and a dispenser element having two dispensing vanes coupled rotationally about respective parallel horizontal axes.

In one embodiment, each of the two dispensing vanes includes a surface at a radial distance from the corresponding parallel horizontal axis.

In one embodiment, the dispensing vanes comprise teeth arranged on the surface.

In one embodiment, the surfaces of the two dispensing vanes are in contact between the parallel horizontal axes.

In one embodiment, the dispensing vane surfaces are flexible in radial directions.

In one embodiment, two dispensing vanes are configured to rotate in opposing directions about the respective parallel horizontal axes to selectively dispense the received ingredients from a hopper.

In one embodiment, each of the two dispensing vanes comprises a polygonal surface having a plurality of teeth arranged on the polygonal surface.

In one embodiment, the polygonal surface is a hexagon.

In one embodiment, the surface of each of two dispensing vanes comprises a material having a durometer of approximately 80.

In one embodiment, the durometer of the material is approximately constant over a temperature range of interest.

In one embodiment, each surface comprises a plurality of surface segments.

In one embodiment, the dispensing vanes further comprise a plurality of radial segments, each radial segment having a distal radial end coupled to a corresponding one of the surface segments.

In one embodiment, each of the teeth are disposed on a corresponding one of the surface segments between the distal radial ends of adjacent radial segments.

In one embodiment, each of the teeth is disposed on the corresponding one of the surface segments at a midpoint between the distal radial ends of adjacent radial segments.

In one embodiment, the teeth arranged on the surface of each of the two dispensing vanes are circumferentially spaced apart on the surface.

In one embodiment, a circumferential spacing and a size of the teeth corresponds to a type of the ingredients being dispensed.

In one embodiment, a circumferential spacing of the teeth on each of the two dispensing vanes is the same.

In one embodiment, the teeth are aligned to engage when the two dispensing vanes rotate in opposing directions about the respective parallel horizontal axes.

In one embodiment, the dispenser unit further comprises a plurality of shafts, each shaft configured to fit within an aperture of a corresponding one of the two dispensing vanes and configured to rotate the corresponding one of the two dispensing vanes about the corresponding parallel horizontal axis.

In one embodiment, the ingredients in the hopper are in a first environment at a first temperature and the dispensed ingredients are in a second environment at a second temperature.

In one embodiment, the first temperature is less than the second temperature.

In one embodiment, contact of the two dispensing vanes is configured to form a seal to isolate the first environment from the second environment.

In one embodiment, a dispensing unit further comprises a dispenser housing.

In one embodiment, the teeth engage with the dispenser housing to form a seal to isolate the first environment from the second environment.

In one embodiment, the ingredients comprise fruits and vegetables.

In one embodiment, the apparatus further comprises a scale positioned to receive dispensed ingredients from the dispenser unit and configured to generate a weight signal indicating a weight of the dispensed ingredients.

In one embodiment, the apparatus further comprises a controller coupled to the two dispensing vanes and to the scale, the controller configured to control rotation of the two dispensing vanes in first opposing directions about the respective parallel horizontal axes to dispense ingredients from the hopper to the scale In one embodiment, the controller determines a flow rate.

In one embodiment, the controller is further configured to detect whether a first flow rate of the dispensed ingredients has reached a minimum threshold value, and, in response to detecting the first flow rate has reached the minimum threshold value, the controller configured to control rotation of the two dispensing vanes in second opposing directions for a predetermined time and to again control rotation of the two dispensing vanes in the first opposing directions after the predetermined time.

In one embodiment, the controller is further configured to detect whether a weight signal indicates the weight of the dispensed ingredients has reached a first weight threshold that is less than a total weight of ingredients to be dispensed, and, in response to detecting the weight of the dispensed ingredient has reached the first weight threshold, the controller is configured to control rotation of the two dispensing vanes to dispense ingredients at a second flow rate that is less than a first flow rate.

In one embodiment, the controller is further configured to detect whether a weight signal indicates a weight of the dispensed ingredients has reached a second weight threshold that is less than the total weight of ingredients to be dispensed, and, in response to detecting the weight of the dispensed ingredients has reached the second weight threshold, the controller configured to control rotation of the two dispensing in the second opposing directions.

In one embodiment, the second weight threshold has a value based on the first flow rate of the ingredients being dispensed.

In one embodiment, the present disclosure includes a replaceable flexible dispenser vane including some or all of the features described above.

The above description illustrates various embodiments of the present disclosure along with examples of how aspects of the particular embodiments may be implemented. The above examples should not be deemed to be the only embodiments, and are presented to illustrate the flexibility and advantages of the particular embodiments as defined by the following claims. Based on the above disclosure and the following claims, other arrangements, embodiments, implementations and equivalents may be employed without departing from the scope of the present disclosure as defined by the claims.

What is claimed is:

1. A vane for a dispenser comprising:
a flexible curved outer surface;
a plurality of flexible teeth arranged radially along a length of the flexible curved outer surface,
wherein the flexible curved outer surface and the plurality of flexible teeth are radially moveable;
an inner surface to receive a shaft; and
a plurality of flexible radial segments between the flexible curved outer surface and the inner surface configured to maintain a back pressure when the flexible curved outer surface moves radially inward.

2. The vane of claim 1, wherein the plurality of flexible radial segments extend radially between the inner surface and flexible curved outer surface.

3. The vane of claim 2, wherein each flexible radial segment has a distal end coupled to the flexible curved outer surface, wherein the plurality of flexible teeth are arranged between the distal radial ends of adjacent radial segments.

4. The vane of claim 2, wherein the flexible curved outer surface comprises a plurality of surface segments supported by the radial segments, and wherein the plurality of flexible teeth are formed between the surface segments.

5. The vane of claim 1, wherein the inner surface and flexible curved outer surface have the same geometric cross section.

6. The vane of claim 1, wherein the inner surface comprises a flexible material.

7. The vane of claim 1, wherein the inner surface is configured to receive a rigid shaft driven by a motor.

8. The vane of claim 1, wherein the inner surface comprises a plurality of interior surface segments and a plurality of corners between the interior surface segments.

9. The vane of claim 1, wherein the inner surface has a polygon cross-section.

10. The vane of claim 1, wherein the vane comprises an approximately circular cross-section.

11. The vane of claim 1, wherein the plurality of flexible teeth are formed from curves in the flexible curved outer surface.

12. The vane of claim 1, wherein the plurality of flexible teeth are angled in a direction of rotation around the horizontal axis.

13. The vane of claim 1, wherein the plurality of flexible teeth are arranged in straight lines along a length of the flexible curved outer surface.

14. The vane of claim 1, wherein the plurality of flexible teeth extend continuously along a length of the flexible curved outer surface.

15. The vane of claim 1, wherein the flexible curved outer surface comprises a plurality of surface segments, and wherein the plurality of flexible teeth are formed between the surface segments.

16. The vane of claim 15, wherein each of the surface segments are substantially flat and the surface segments curve around the horizontal axis.

17. The vane of claim 1, wherein adjacent flexible radial segments, a portion of the flexible curved outer surface between the adjacent flexible radial segments, and a portion of the inner surface between the flexible radial segments form a compression area.

18. A vane for a dispenser comprising:
a flexible curved outer surface;
a plurality of flexible teeth arranged radially along a length of the flexible curved outer surface,
wherein the flexible curved outer surface and the plurality of flexible teeth are radially moveable;
an inner surface to receive a shaft; and
means for maintaining a back pressure between the flexible curved outer surface and the inner surface when the outer surface moves radially.

19. The vane of claim 18, wherein said means for maintaining back pressure comprises a plurality of flexible segments between the flexible curved outer surface and the inner surface.

20. A vane for a dispenser comprising:
a flexible curved outer surface comprising a plurality of surface segments having a substantially uniform thickness and comprising a plurality of flexible teeth, wherein the plurality of flexible teeth are formed from folds of the flexible curved outer surface between the plurality of surface segments, wherein each flexible tooth is continuous along a length of the flexible curved outer surface, and wherein the flexible curved outer surface and the plurality of flexible teeth are radially moveable;
a flexible inner surface to receive a shaft;
a plurality of flexible radial segments extending radially between the flexible curved outer surface and the flexible inner surface, wherein adjacent flexible radial segments of the plurality of flexible radial segments, a portion of the flexible curved outer surface between the adjacent flexible radial segments, and a portion of the flexible inner surface between the radial segments form a compression area,
wherein the plurality of flexible radial segments between the flexible curved outer surface and flexible inner surface are configured to maintain a back pressure when the flexible curved outer surface moves radially inward, and
wherein the flexible curved outer surface, the flexible inner surface, and the plurality of flexible radial segments are formed from a single flexible material.

* * * * *